United States Patent
Dudar

(10) Patent No.: US 10,947,921 B2
(45) Date of Patent: Mar. 16, 2021

(54) SYSTEMS AND METHODS FOR INTAKE OXYGEN SENSOR DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 416 days.

(21) Appl. No.: 15/865,131

(22) Filed: Jan. 8, 2018

(65) Prior Publication Data
US 2019/0211769 A1 Jul. 11, 2019

(51) Int. Cl.
*F02D 41/22* (2006.01)
*B60K 6/24* (2007.10)
(Continued)

(52) U.S. Cl.
CPC .............. *F02D 41/222* (2013.01); *B60K 6/24* (2013.01); *B60W 20/50* (2013.01); *F02D 13/0215* (2013.01); *F02M 25/0836* (2013.01); *F02M 25/0854* (2013.01); *G01M 15/02* (2013.01); *B60W 2510/0676* (2013.01); *B60Y 2200/92* (2013.01); *B60Y 2300/432* (2013.01);
(Continued)

(58) Field of Classification Search
CPC .... F02D 41/222; F02D 13/0215; F02D 41/26; B60K 6/24; B60W 20/50; B60W 2510/0676; F02M 25/0836; F02M 25/0854; G01M 15/02; B60Y 2200/92; B60Y 2300/432; B60Y 2300/433; B60Y 2300/435; B60Y 2300/437; Y10S 903/905; Y10S 903/93
See application file for complete search history.

(56) References Cited

U.S. PATENT DOCUMENTS

2007/0149349 A1* 6/2007 Utsumi ................. B60W 20/50 477/3
2013/0304359 A1* 11/2013 Yahata ................. F02D 41/1467 701/112
(Continued)

OTHER PUBLICATIONS

Dudar, A., "System and Method for Diagnosing a Positive Crankcase Ventilation Valve," U.S. Appl. No. 15/373,154, filed Dec. 8, 2016, 65 pages.
(Continued)

*Primary Examiner* — Lail A Kleinman
(74) *Attorney, Agent, or Firm* — Geoffrey Brumbaugh; McCoy Russell LLP

(57) ABSTRACT

Methods and systems are provided for diagnosing whether one or more intake air oxygen sensors positioned in an intake of an engine of a vehicle, are functioning as desired. In one example, a method comprises injecting fuel into one or more cylinders of the engine without combustion, routing un-combusted hydrocarbons from the one or more cylinders to the intake via a crankcase ventilation system, and indicating whether the one or more intake air oxygen sensors are functioning as desired based on a response of the one or more intake air oxygen sensors. In this way, the one or more intake air oxygen sensors may be periodically diagnosed which may improve engine operation, and reduce engine degradation, particularly with regard to hybrid electric vehicles with limited engine run-time.

19 Claims, 6 Drawing Sheets

(51) Int. Cl.
  *B60W 20/50* (2016.01)
  *F02D 13/02* (2006.01)
  *F02M 25/08* (2006.01)
  *G01M 15/02* (2006.01)
  *F02D 41/26* (2006.01)

(52) U.S. Cl.
  CPC ... *B60Y 2300/433* (2013.01); *B60Y 2300/435* (2013.01); *B60Y 2300/437* (2013.01); *F02D 41/26* (2013.01); *Y10S 903/905* (2013.01); *Y10S 903/93* (2013.01)

(56) References Cited

U.S. PATENT DOCUMENTS

| | | | |
|---|---|---|---|
| 2017/0002761 A1* | 1/2017 | Dudar | F02D 35/02 |
| 2018/0051616 A1* | 2/2018 | Khaled | F01N 13/0093 |
| 2018/0179978 A1* | 6/2018 | Sakumoto | B01D 53/9431 |

OTHER PUBLICATIONS

Dudar, A., "System and Method for Diagnosing a Variable Displacement Engine," U.S. Appl. No. 15/608,806, filed May 30, 2017, 40 pages.

\* cited by examiner

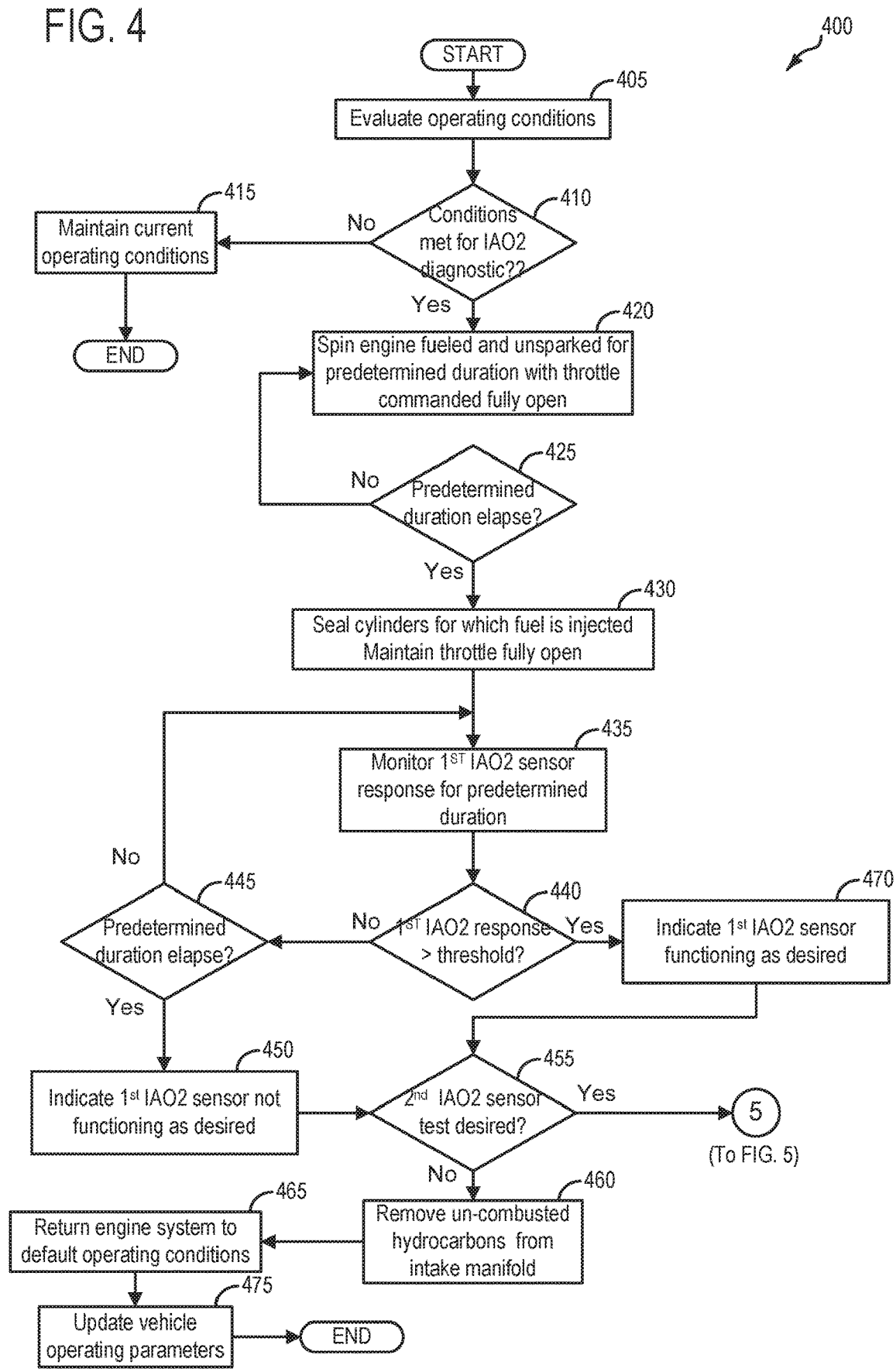

SYSTEMS AND METHODS FOR INTAKE OXYGEN SENSOR DIAGNOSTICS

FIELD

The present description relates generally to methods and systems for controlling a vehicle engine to diagnose whether one or more intake air oxygen sensor(s) positioned in an intake of the engine are functioning as desired.

BACKGROUND/SUMMARY

Vehicles such as some hybrid electric vehicles (HEVs) and/or plug-in hybrid electric vehicles (PHEVs) have fuel tanks that are sealed except for during refueling events, or under conditions when a diagnostic is being conducted. By sealing the fuel tank as such, fuel vapors generated due to running loss and/or diurnal cycle temperature fluctuations are prevented from loading a fuel vapor storage canister positioned in an evaporative emissions system of such vehicles. By avoiding such loading of the canister, bleed emissions may be reduced in vehicles such as HEVs and PHEVs, for which engine run time, and thus opportunities for purging the canister of stored fuel vapors, are limited. More specifically, fuel vapors stored in the canister of such hybrids may only be purged under conditions where the engine is running, such that vacuum derived from the rotating engine may be applied to the canister, thus drawing fuel vapors from the canister to the engine for combustion. As HEVs and PHEVs limit engine operation, opportunities for purging of the canister are thus limited.

Purging of the canister may be under feedback control. For example, an exhaust gas oxygen sensor may be utilized to monitor air/fuel ratio downstream of the engine, which may enable an estimation of canister loading state. However, such a method suffers from the fact that because the sensor is positioned downstream of the engine, there may be examples where the engine may stall due to a rich desorption of vapors from the canister being inducted into the engine prior to a desorption rate being learned during the purging operation.

To avoid such issues, some canister purging strategies include feedforward control, in which an intake air oxygen (IAO2) sensor positioned in the intake manifold is utilized to measure concentration of purge vapors prior to reaching the engine. Based on the indicated concentration, a fueling strategy may control (e.g. reduce) injector pulses in order to maintain stoichiometric air/fuel ratio, which may thus avoid undesired engine stall event(s), for example.

However, accurate feedforward control assumes an IAO2 sensor positioned in the intake manifold that is functioning as desired. In a non-hybrid vehicle where the fuel vapor canister is frequently purged, such an IAO2 sensor may regularly be exposed to fuel vapors, and thus may regularly be exposed to situations where it may be inferred as to whether the IAO2 sensor is functioning as desired. Alternatively, in hybrid vehicles with limited engine run time, there may not be frequent opportunities to rationalize the IAO2 sensor. Thus, in a situation where the IAO2 sensor has not been diagnosed and has become degraded, any purge event that draws fuel vapors from the canister to engine intake may not accurately compensate for such vapors, which may lead to an engine stall. Furthermore, inability to routinely and accurately rationalize the IAO2 sensor may lead to standardized completion rates not being met.

Along similar lines, another, second IAO2 sensor may be in some examples included in an intake passage upstream of the IAO2 sensor for purge control (e.g. first IAO2 sensor). The second IAO2 sensor may comprise a sensor for exhaust gas recirculation (EGR) control, and similar to that discussed above, in hybrid vehicles there may be limited opportunities to diagnose such a sensor.

The inventors have recognized the above-mentioned issues, and have herein developed systems and methods to address them. In one example, a method comprises injecting fuel into one or more cylinders of an engine of a vehicle without combustion, and routing un-combusted hydrocarbons from the one or more cylinders to a crankcase of the engine, the crankcase included in a crankcase ventilation system, and then to an intake manifold of the engine, in order to diagnose whether a first intake air oxygen sensor positioned in the intake manifold is functioning as desired. In this way, the IAO2 sensor may be diagnosed under conditions where the engine is not combusting air and fuel, which may be particularly advantageous for hybrid vehicles with limited engine run-time.

As one example, actively routing un-combusted hydrocarbons may further comprise sealing the one or more cylinders of the engine. For example, sealing the one or more cylinders of the engine may include commanding intake and exhaust valves coupled to each of the one or more cylinders of the engine to fully closed positions. Such action may be enabled where the engine comprises a variable displacement engine, and where commanding the intake and exhaust valves coupled to each of the one or more cylinders to the fully closed positions involves actuating a first variable displacement engine actuator and actuating a second variable displacement engine actuator.

As another example, actively routing un-combusted hydrocarbons may further comprise a temperature of the engine below a threshold engine temperature, where one or more piston rings coupled to pistons of the one or more cylinders of the engine are inefficient at sealing the one or more cylinders from the crankcase. In this way, the un-combusted hydrocarbons may seep into the crankcase via the inefficient sealing capability of the one or more piston rings, which may enable the un-combusted hydrocarbons to be effectively routed to the intake manifold of the engine for diagnosing the IAO2 sensor.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 4 depicts a high-level flowchart of an example method for conducting a diagnostic on a first intake air oxygen sensor(s).

DETAILED DESCRIPTION

Figure 5:
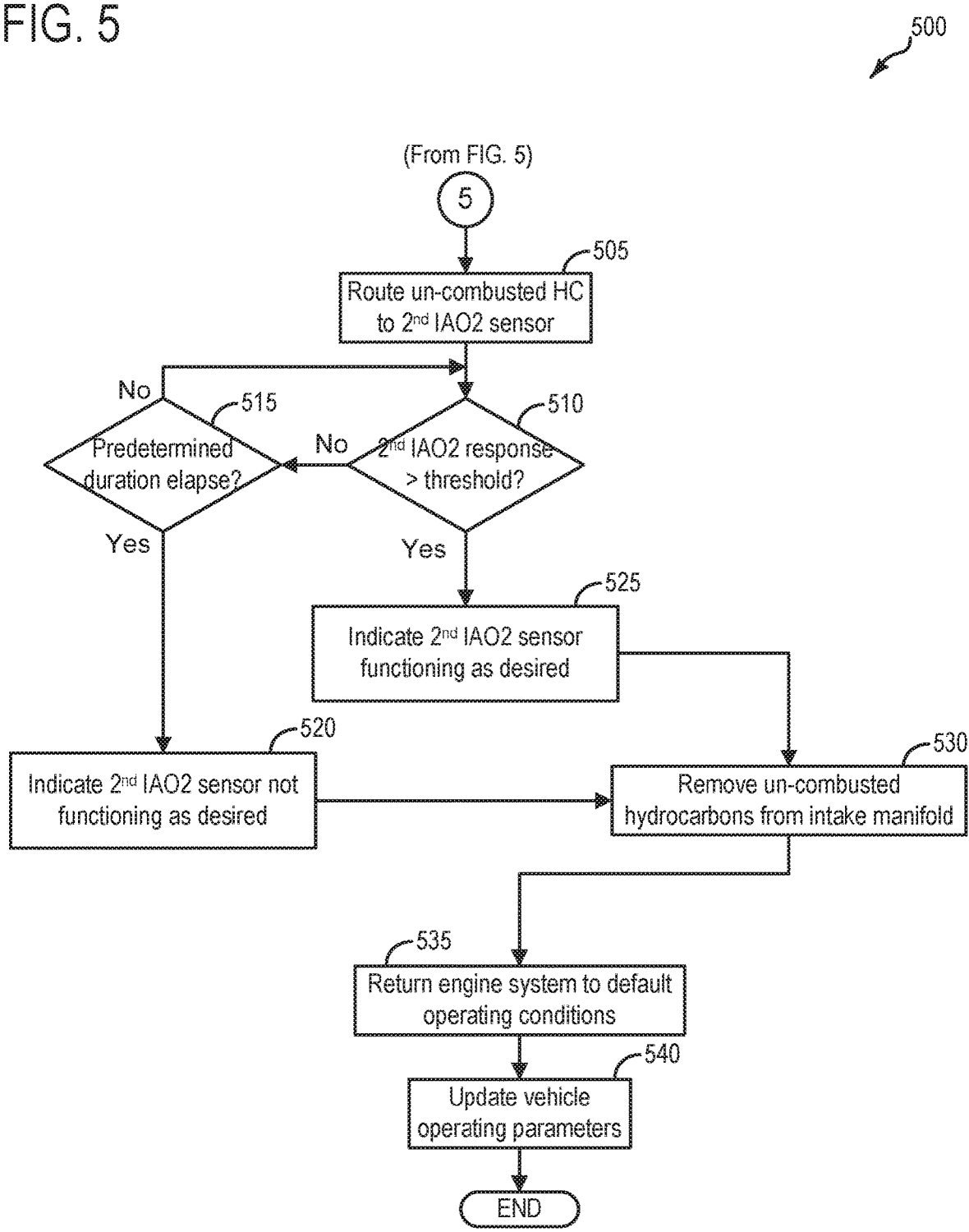
FIG. 5 depicts a high-level flowchart for diagnosing a second intake air oxygen sensor, proceeding from the method depicted at FIG. 4.
Figure 6:
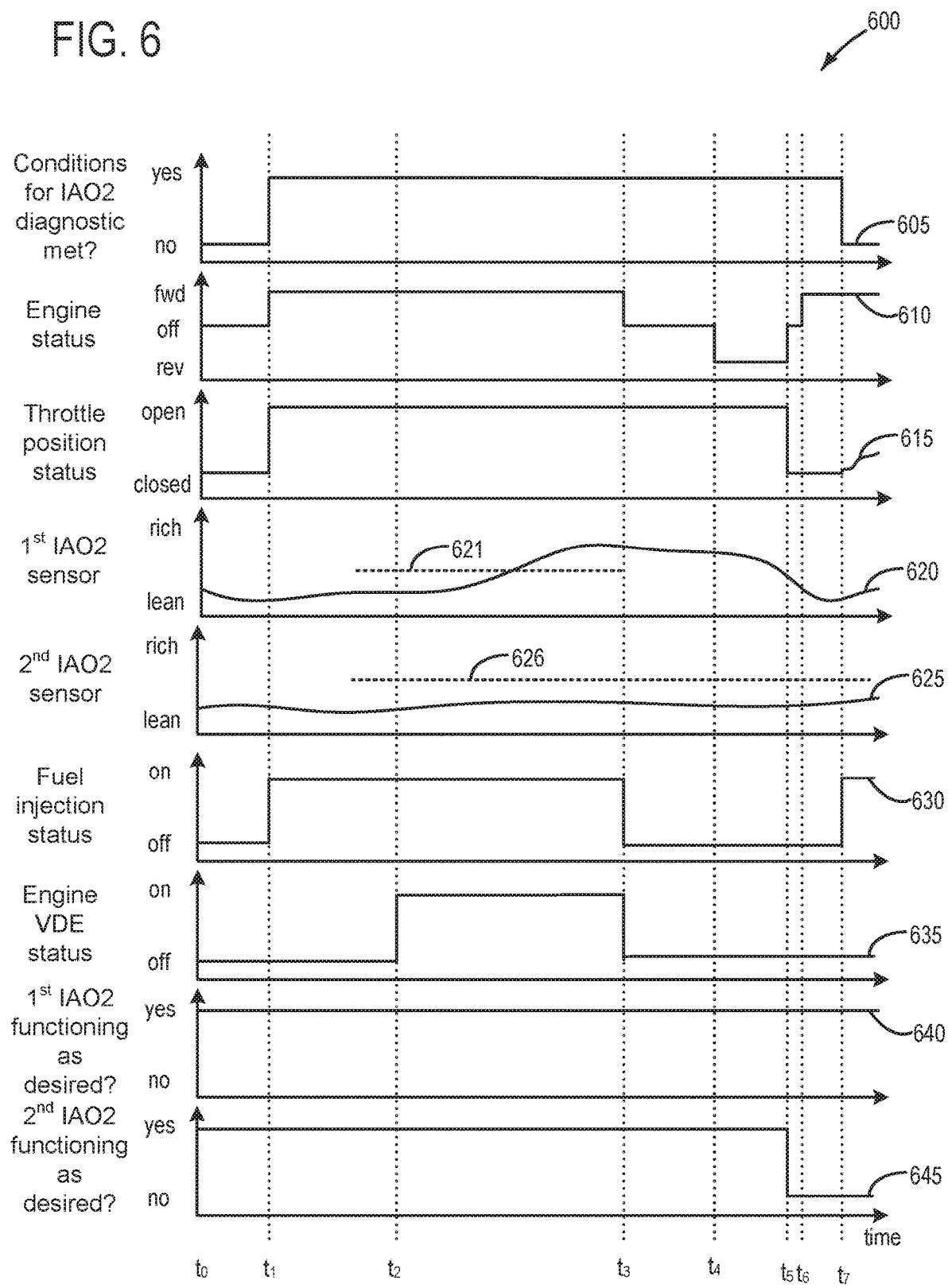
FIG. 6 illustrates an example timeline for diagnosing the first and the second intake air oxygen sensors, according to the methods of FIGS. 4-5.

The following description relates to systems and methods for diagnosing whether a first intake air oxygen sensor (first IAO2 sensor) and/or a second intake air oxygen sensor (second IAO2 sensor) are functioning as desired or expected. The first IAO2 sensor may be positioned downstream of a throttle in an engine system such as the engine system depicted at FIG. 1. The second IAO2 sensor may be positioned upstream of the throttle in such an engine system. The methodology for diagnosing functionality of the first and second IAO2 sensors may comprise injecting fuel into sealed cylinders, such that un-combusted hydrocarbons may migrate through a crankcase ventilation system, depicted at FIG. 1, to engine intake, where the un-combusted hydrocarbons may result in the first and/or second IAO2 sensor(s) registering rich (where a rich indication corresponds to a reduced concentration of oxygen in the vicinity of the sensor, the oxygen displaced by un-combusted hydrocarbons). To seal the cylinders, variable displacement engine (VDE) technology may be employed, such as that depicted at FIGS. 1-2. Furthermore, routing the un-combusted hydrocarbons through the crankcase ventilation system and to engine intake may include a positive crankcase ventilation (PCV) valve occupying a predominantly open configuration (e.g. a least restrictive position), the position of which may be achieved by manipulation of pressure in the intake of the engine, as illustrated schematically at FIGS. 3A-3C. An example methodology for diagnosing the first IAO2 sensor is depicted at FIG. 4, and an example methodology for diagnosing the second IAO2 sensor is depicted at FIG. 5. An example timeline for diagnosing the first IAO2 sensor and the second IAO2 sensor is depicted at FIG. 6.

Figure 1:
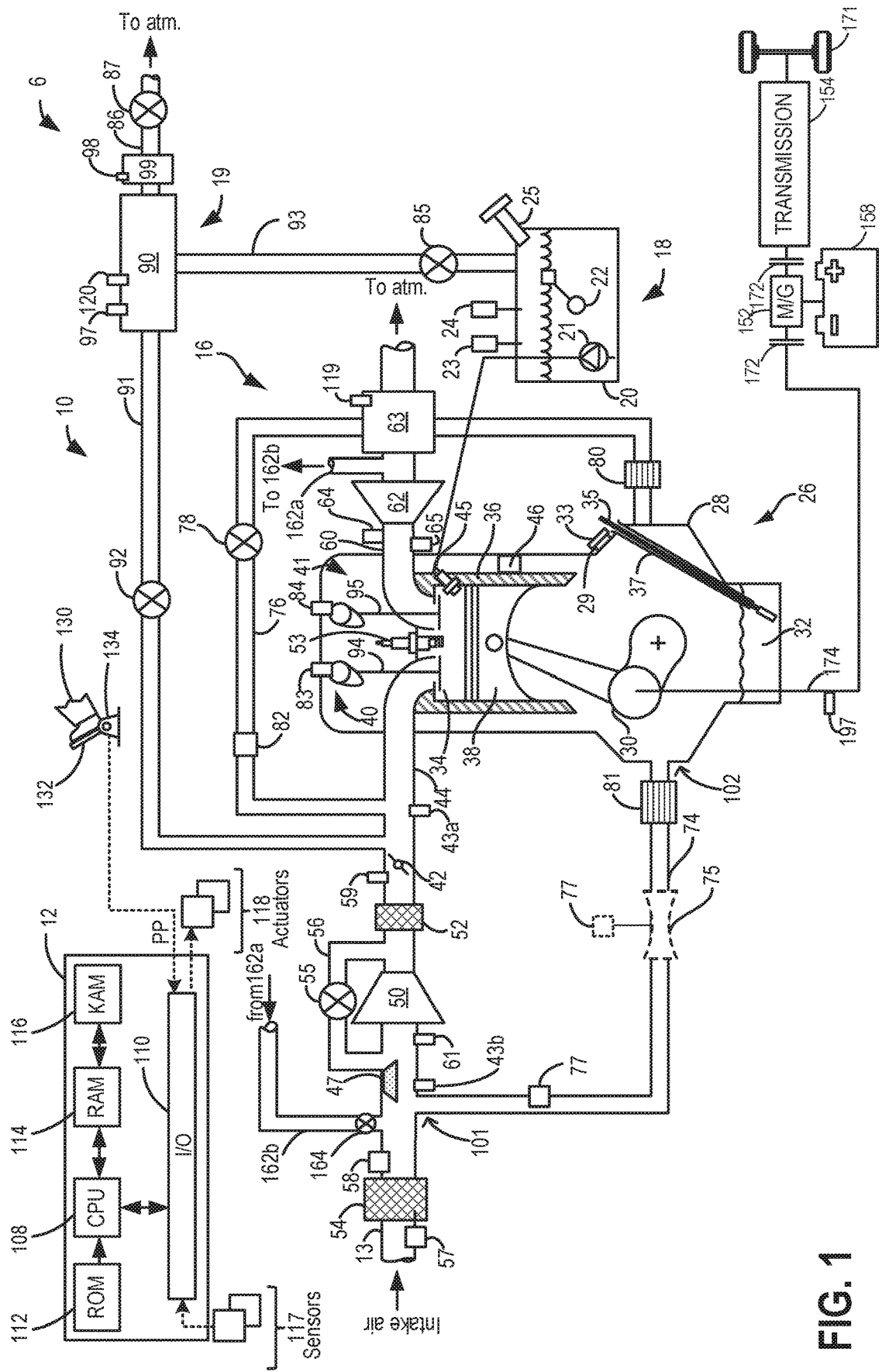
FIG. 1 shows a schematic description of an engine including an engine positive crankcase ventilation (PCV) system.

Turning now to FIG. 1, a schematic depiction of a hybrid vehicle system 6 is presented that can derive propulsion power from engine system 10 and/or an on-board energy storage device, such as a battery system (see below). An energy conversion device, such as a generator (see below), may be operated to absorb energy from vehicle motion and/or engine operation, and then convert the absorbed energy to an energy form suitable for storage by the energy storage device. Engine system 10 may comprise a multi-cylinder internal combustion engine, which may be included in a propulsion system of an automotive vehicle. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil fill port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 44 which is positioned downstream of throttle 42. The engine block 26 may also include an engine coolant temperature (ECT) sensor 46 input into an engine controller 12.

In some embodiments, each cylinder of engine 10 may include a spark plug 53 for initiating combustion. An ignition system (not shown) may provide an ignition spark to cylinder 34 via spark plug 53 in response to a spark advance signal from a controller, under select operating modes.

A throttle 42 may be disposed in the engine intake to control the airflow entering intake manifold 44 and may be preceded upstream by compressor 50 followed by charge air cooler 52, for example. An air filter 54 may be positioned upstream of compressor 50 and may filter fresh air entering intake passage 13. The intake air may enter combustion chamber 34 via electrically-actuated intake valve system 40. Likewise, combusted exhaust gas may exit combustion chamber 34 via electrically-actuated exhaust valve system 41. In an alternate embodiment, one or more of the intake valve system and the exhaust valve system may be cam-actuated. Intake air may bypass compressor 50 via compressor bypass conduit 56, during conditions wherein compressor bypass valve (CBV) 55 is opened. In this way, pressure buildup at the compressor inlet may be relieved.

Each cylinder of engine 10 may include one or more intake valves and one or more exhaust valves. For example, cylinder 34 is shown including at least one intake valve 94 and at least one exhaust valve 95 located at an upper region of cylinder 34. The valves of cylinder 34 may in some examples be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves. As will be further discussed below at FIG. 2, engine 10 may comprise a variable displacement engine (VDE) where each cylinder of engine 10 may be selectively deactivatable, where deactivatable refers to the ability of the controller to command both intake and exhaust valves closed for particular cylinder(s), thus sealing the particular cylinders. If fuel injection is also stopped, then such action may result in the particular cylinder(s) being essentially an air-spring. Accordingly, as depicted herein, in one embodiment, deactivation of intake valve 94 may be controlled by first VDE actuator 83 while deactivation of exhaust valve 95 may be controlled by second VDE actuator 84. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators. Cylinder 34 may have a compression ratio, which is the ratio of volumes when piston 38 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, a first intake air oxygen sensor 43a (first IAO2 sensor) may be positioned downstream of throttle 42. Furthermore, in some examples, an air intake system hydrocarbon (AIS HC) trap 47 may be positioned downstream of air filter 54, but upstream of compressor 50. Still further, in some examples, a second intake air oxygen sensor 43b (second IAO2 sensor) may be positioned upstream of the throttle 42. Second intake air oxygen sensor 43b may constitute an intake air oxygen sensor utilize for exhaust gas recirculation (EGR) purposes, for example, and may be used in vehicles in which fuel is injected directly, for example gasoline turbo direct injection (GTDI) engines.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate (not shown) bypassing it. Exhaust gas sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12. Engine exhaust 60 may further include one or more emission control devices 63 mounted in a close-coupled position. The one or more emission control devices may include a three-way catalyst, lean NOx trap, diesel particulate filter, oxidation catalyst, etc. In some examples, multiple exhaust gas sensors may be positioned both upstream and downstream of emission control device 63. In some examples, an electric heater 119 may be coupled to the emission control device(s), and may be under control of the controller. Such an electric heater may be utilized in some examples to raise temperature of the emission control device to a light-off temperature, or otherwise referred to as operating temperature.

In the example of FIG. 1, a positive crankcase ventilation (PCV) system 16 is coupled to the engine intake so that gases in the crankcase may be vented in a controlled manner from the crankcase. During non-boosted conditions (when manifold pressure (MAP) is less than barometric pressure (BP)), the crankcase ventilation system 16 draws air into crankcase 28 via a breather or crankcase ventilation tube 74. A first side 101 of crankcase ventilation tube 74 may be mechanically coupled, or connected, to fresh air intake passage 13 upstream of compressor 50. In some examples, the first side 101 of crankcase ventilation tube 74 may be coupled to intake passage 13 downstream of air filter 54 (as shown). In other examples, the crankcase ventilation tube may be coupled to intake passage 13 upstream of air filter 54. A second, opposite side 102 of crankcase ventilation tube 74 may be mechanically coupled, or connected, to crankcase 28 via an oil separator 81.

Crankcase ventilation tube 74 further includes a sensor 77 coupled therein for providing an estimate about air flowing through crankcase ventilation tube 74 (e.g., flow rate, pressure, etc.). In some embodiments, crankcase vent tube sensor 77 may be a pressure sensor, referred to herein as a crankcase pressure sensor (CKCP sensor) 77. When configured as a pressure sensor, CKCP sensor 77 may be an absolute pressure sensor or a gauge sensor. In an alternate embodiment, sensor 77 may be a flow sensor or flow meter. In still another embodiment, sensor 77 may be configured as a venturi. In some embodiments, in addition to a pressure or flow sensor 77, the crankcase vent tube may optionally include a venturi 75 for sensing flow there-through. In still other embodiments, pressure sensor 77 may be coupled to a neck of venturi 75 to estimate a pressure drop across the venturi. One or more additional pressure and/or flow sensors may be coupled to the crankcase ventilation system at alternate locations. For example, a barometric pressure sensor (BP sensor) 57 may be coupled to intake passage 13, upstream of air filter 54, for providing an estimate of barometric pressure. In one example, where crankcase vent tube sensor 77 is configured as a gauge sensor, BP sensor 57 may be used in conjunction with gauge pressure sensor 77. In some embodiments, pressure sensor 61 may be coupled in intake passage 13 downstream of air filter 54 and upstream of compressor 50 to provide an estimate of the compressor inlet pressure (CIP). However, since crankcase vent tube pressure sensor 77 may provide an accurate estimate of a compressor inlet pressure during elevated engine air flow conditions (such as during engine run-up), the need for a dedicated CIP sensor may be reduced. Further still, a pressure sensor 59 may be coupled downstream of compressor 50 for providing an estimate of a throttle inlet pressure (TIP). Any of the above-mentioned pressure sensors may be absolute pressure sensor or gauge sensors.

PCV system 16 also vents gases out of the crankcase and into intake manifold 44 via a conduit 76 (herein also referred to as PCV line 76). In some examples, PCV line 76 may include a PCV valve 78, which may be an electronically controlled valve that is controlled by controller 12. Additionally or alternatively, PCV line 76 may include a one-way valve (that is, a passive valve that tends to seal when flow is in the opposite direction) to prevent airflow from the intake manifold into the crankcase via PCV line 76 during boost conditions. In one embodiment, the PCV valve may actively or passively vary its flow restriction in response to the pressure drop across it (or flow rate through it). It will be appreciated that, as used herein, PCV flow refers to the flow of gases through PCV line 76 from the crankcase to the intake manifold. Similarly, as used herein, PCV backflow refers to the flow of gases through PCV line 76 from the intake manifold to the crankcase. PCV backflow may occur when intake manifold pressure is higher than crankcase pressure (e.g., during boosted engine operation). In some examples, PCV system 16 may be equipped with a check valve for preventing PCV backflow. It will be appreciated that while the depicted example shows PCV valve 78 as a passive valve, this is not meant to be limiting, and in alternate embodiments, PCV valve 78 may be an electronically controlled valve (e.g., a powertrain control module (PCM) controlled valve) wherein a controller may command a signal to change a position of the valve from an open position (or a position of high flow) to a closed position (or a position of low flow), or vice versa, or any position there-between.

The gases in crankcase 28 may consist of un-burned fuel or un-combusted fuel, un-combusted fuel vapor, un-combusted air, and fully or partially combusted gases. Further, lubricant mist may also be present. As such, various oil separators may be incorporated in crankcase ventilation system 16 to reduce exiting of the oil mist from the crankcase through the PCV system. For example, PCV line 76 may include a uni-directional oil separator 80 which filters oil from vapors exiting crankcase 28 before they re-enter the intake manifold 44. Another oil separator 81 may be disposed in crankcase ventilation tube 74 to remove oil from the stream of gases exiting the crankcases during boosted operation. Additionally, PCV line 76 may also include a vacuum sensor 82 coupled to the PCV system. In other embodiments, a MAP or manifold vacuum (ManVac) sensor may be located in intake manifold 44.

Engine system 10 is coupled to a fuel system 18. Fuel system 18 includes a fuel tank 20 coupled to a fuel pump 21 and a fuel vapor canister 90. During a fuel tank refueling event, fuel may be pumped into the vehicle from an external source through refueling port 25. Fuel tank 20 may hold a plurality of fuel blends, including fuel with a range of alcohol concentrations, such as various gasoline-ethanol blends, including E10, E85, gasoline, etc., and combinations thereof. A fuel level sensor 22 located in fuel tank 20 may provide an indication of the fuel level ("Fuel Level Input") to controller 12. As depicted, fuel level sensor 22 may comprise a float connected to a variable resistor. Alternatively, other types of fuel level sensors may be used.

Fuel pump 21 is configured to pressurize fuel delivered to the injectors of engine 10, such as example injector 45. It will be appreciated that fuel system 18 may be a return-less fuel system, a return fuel system, or various other types of fuel system. Vapors generated in fuel tank 20 may be routed to fuel vapor storage canister 90 (also referred to herein as fuel vapor canister, or just canister), via conduit 93, before being purged to engine intake manifold 44.

Fuel vapor canister 90 (also referred to herein as fuel vapor storage canister, or simply, canister) may be positioned in evaporative emissions system 19. Fuel vapor canister 90 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 90 may be purged to engine intake passage 13 by opening canister purge valve (CPV) 92. A loading state of vapor canister 90 may be indicated by a hydrocarbon sensor 120. While a single canister 90 is shown, it will be appreciated that evaporative emissions system 19 may include any number of canisters. In one example, CPV 92 may be a solenoid valve wherein opening or closing of the valve is performed via actuation of a canister purge valve solenoid.

Canister 90 may include a buffer (or buffer region), each of the canister and the buffer comprising the adsorbent. The volume of the buffer may be smaller than (e.g., a fraction of) the volume of canister 90. The adsorbent in the buffer may be same as, or different from, the adsorbent in the canister (e.g., both may include charcoal). The buffer may be positioned within canister 90 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 90 includes a vent line 86 for routing gases out of the canister 90 to the atmosphere when storing, or trapping, fuel vapors from fuel tank 20. Vent line 86 may also allow fresh air to be drawn into fuel vapor canister 90 when purging stored fuel vapors to engine intake passage 13 via purge line 91 and CPV 92. While this example shows vent 86 communicating with fresh, unheated air, various modifications may also be used. Vent 86 may include a canister vent valve (CVV) 87 to adjust a flow of air and vapors between canister 90 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 87 may be a solenoid valve wherein opening or closing of the valve is performed via actuation of a canister vent solenoid. In particular, the canister vent valve may be a default-open valve that is closed upon actuation of the canister vent solenoid. In some examples, an air filter may be coupled in vent 86 between canister vent valve 87 and atmosphere.

Hybrid vehicle system 6 may have reduced engine operation times due to the vehicle being powered by engine system 10 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 85 may be optionally included in conduit 93 such that fuel tank 20 is coupled to canister 90 via the valve. During regular engine operation, isolation valve 85 may be kept closed to limit the amount of diurnal or "running loss" vapors directed to canister 90 from fuel tank 20. During refueling operations, and selected purging conditions, isolation valve 85 may be temporarily opened, e.g., for a duration, to direct fuel vapors from the fuel tank 20 to canister 90. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 85 positioned along conduit 93, in alternate embodiments, the isolation valve may be mounted on fuel tank 20. The fuel system may be considered to be sealed when isolation valve 85 is closed. In embodiments where the fuel system does not include isolation valve 85, the fuel system may be considered sealed when CPV 92 and CVV 87 are both closed.

One or more pressure sensors 23 may be coupled to fuel system 18 for providing an estimate of a fuel system pressure. In one example, the fuel system pressure is a fuel tank pressure, wherein pressure sensor 23 is a fuel tank pressure sensor coupled to fuel tank 20 for estimating a fuel tank pressure or vacuum level. While the depicted example shows pressure sensor 23 directly coupled to fuel tank 20, in alternate embodiments, the pressure sensor may be coupled between the fuel tank and canister 90, specifically between the fuel tank and isolation valve 85. In some embodiments, a pressure sensor may additionally be coupled between the canister 90 and the canister vent valve 87, such as pressure sensor 98, for example. In still further embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system having undesired evaporative emissions based on changes in a fuel tank pressure during a diagnostic routine. When a pressure sensor is included upstream of isolation valve 85, such as canister pressure sensor 98, an evaporative emissions system having undesired evaporative emissions may be indicated based on changes in canister pressure during a diagnostic routine while isolation valve 85 is maintained closed.

One or more temperature sensors 24 may also be coupled to fuel system 18 for providing an estimate of a fuel system temperature. In one example, the fuel system temperature is a fuel tank temperature, wherein temperature sensor 24 is a fuel tank temperature sensor coupled to fuel tank 20 for estimating a fuel tank temperature. While the depicted example shows temperature sensor 24 directly coupled to fuel tank 20, in alternate embodiments, the temperature sensor may be coupled between the fuel tank and canister 90. A canister temperature sensor 97 may be coupled to canister 90 and configured to indicate temperature changes of the adsorbent material within the canister. As fuel vapor adsorption is an exothermic reaction and fuel vapor desorption is an endothermic reaction, the canister temperature may be used to indicate a quantity of fuel vapor adsorbed during a venting event (e.g., during refueling), and/or the quantity of fuel vapor desorbed during a purging operation. The canister temperature may thus be used to infer the canister load, while changes in canister temperature may be used to determine the capacity and/or integrity of the fuel vapor canister.

Fuel vapors released from canister 90, for example during a purging operation, may be directed into engine intake manifold 44 via purge line 91. The flow of vapors along purge line 91 may be regulated by CPV 92, coupled between the fuel vapor canister and the engine intake. The quantity and rate of vapors released by the CPV may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 91 to prevent intake manifold pressure from flowing gases in the opposite direction of the purge flow. As such, the check valve may be necessary if the canister purge valve control is not accurately timed or the canister purge valve itself can be forced open by a high intake manifold pressure.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 85 and CVV 87 while closing CPV 92 to direct refueling vapors into canister 90 while preventing fuel vapors from being directed into the intake manifold.

As another example, the fuel system may be operated in a refueling mode (e.g., when fuel tank refueling is requested by a vehicle operator), wherein the controller 12 may open isolation valve 85 and CVV 87, while maintaining CPV 92 closed, to depressurize the fuel tank before allowing enabling fuel to be added therein. As such, isolation valve 85 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 92 and canister vent valve while closing isolation valve 85. Herein, the vacuum generated by the intake manifold of the operating engine may be used to draw fresh air through vent 86 and through fuel vapor canister 90 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister.

Controller 12 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 12 may receive various signals from sensors 117 coupled to engine 10, including measurement of inducted mass air flow (MAF) from mass air flow sensor 58; engine coolant temperature (ECT) from temperature sensor 46; PCV pressure from vacuum sensor 82; exhaust gas air/fuel ratio from exhaust gas sensor 64; exhaust temperature sensor 65; crankcase vent tube pressure sensor 77, BP sensor 57, CIP sensor 61, TIP sensor 59, canister temperature sensor 97, etc. Furthermore, controller 12 may monitor and adjust the position of various actuators 118 based on input received from the various sensors. These actuators may include, for example, throttle 42, intake and exhaust valve systems 40, 41, and PCV valve 78, CPV 92, FTIV 85, etc. Storage medium read-only memory 112 can be programmed with computer readable data representing instructions executable by processor 108 for performing the methods described below, as well as other variants that are anticipated but not specifically listed.

Controller 12 may also be configured to intermittently perform undesired evaporative emission detection routines on fuel system 18 and/or evaporative emissions system 19. Tests may be performed by an evaporative level check module (ELCM) 99 communicatively coupled to controller 12. ELCM 99 may be coupled in vent 86, between canister 90 and the atmosphere. ELCM 99 may include a vacuum pump for applying negative pressure to the fuel system when administering a test. In some embodiments, the vacuum pump may be configured to be reversible. In other words, the vacuum pump may be configured to apply either a negative pressure or a positive pressure on the fuel system. ELCM 99 may further include a reference orifice and a pressure sensor 98. The reference orifice may enable a threshold pressure to be determined based on current ambient and operating conditions. Following the applying of vacuum to the fuel system, a change in pressure at pressure sensor 98 (e.g., an absolute change or a rate of change) may be monitored and compared to the threshold pressure. Based on the comparison, a fuel system may be diagnosed for undesired evaporative emissions. As such, various diagnostic detection tests may be performed while the engine is off (engine-off test) or while the engine is running (engine-on test). Tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Tests performed while the engine is not running may include sealing the fuel system following engine shut-off and monitoring a change in fuel tank pressure. This type of test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values. Following a vehicle-off event, as heat continues to be rejected from the engine into the fuel tank, the fuel tank pressure will initially rise. During conditions of relatively high ambient temperature, a pressure build above a threshold may be considered a passing test.

Further, controller 12 may be configured to intermittently perform detection routines on the crankcase ventilation system. This may include monitoring an output of crankcase vent line pressure sensor 77 when pre-determined conditions are met. For example, during engine cranking, intake manifold vacuum may be low. As such, the PCV valve may be open, causing a threshold flow of air through the crankcase and back into the intake manifold. As the engine speed increases following cranking, the manifold airflow increases. This may decrease the airflow through the crankcase vent line. In a V-type engine, this sequence of events causes a characteristic dip in the crankcase vent line pressure. However, if the crankcase vent line is disconnected at the crankcase side (e.g., second side 102), the characteristic dip may not be observed, and degradation of the crankcase vent line may be indicated.

As discussed, hybrid vehicle system 6 may include multiple sources of torque available to one or more vehicle wheels 171, however, in other examples, the vehicle may include an engine without other sources of torque available. In the example shown, hybrid vehicle system 6 includes an electric machine 152. Electric machine 152 may be a motor or a motor/generator. Crankshaft 174 of engine 10 and electric machine 152 are connected via a transmission 154 to vehicle wheels 171 when one or more clutches 172 are engaged. In the depicted example, a first clutch is provided between crankshaft 174 and electric machine 152, and a second clutch is provided between electric machine 152 and transmission 154. Controller 12 may send a signal to an actuator of each clutch 172 to engage or disengage the clutch, so as to connect or disconnect crankshaft from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 158 (also described herein as onboard energy storage device) to provide torque to vehicle wheels 171. Electric machine 152 may also be operated as a generator to provide electrical power to charge traction battery 158, for example during a braking operation.

Hybrid vehicle system 6 may include an exhaust gas recirculation (EGR) system. Specifically, the EGR system may include one or more of high pressure EGR, or low pressure EGR. In the example illustration depicted at FIG. 1, a low pressure EGR system is illustrated. Specifically, an EGR passage is indicated, the EGR passage comprising passage 162a and 162b. It may be understood that passage 162a and 162b may comprise the same EGR passage, but is indicated as a broken passage for clarity. The EGR passage comprising passage 162a and 162b may further include EGR valve 164. By controlling timing of opening and closing of EGR valve 164, an amount of exhaust gas recirculation may be appropriately regulated.

Figure 2:
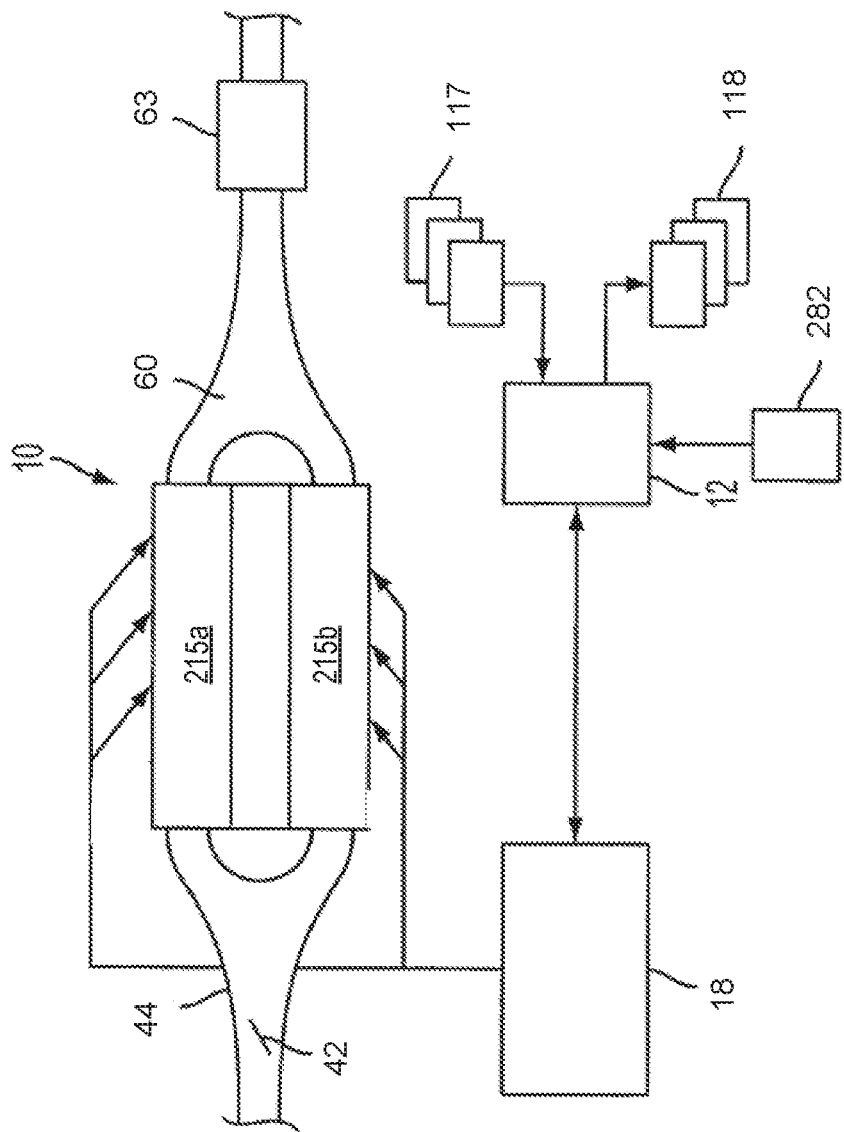
FIG. 2 schematically shows an example vehicle propulsion system.

Turning to FIG. 2, it shows an example where engine 10 comprises a variable displacement engine (VDE), including a first bank 215a and a second bank 215b. In the depicted example, engine 10 is a V6 engine with the first and second banks each having three cylinders. However, in alternate embodiments, the engine may have a different number of engine cylinders, such as 4, 8, 10, 12, etc. Engine 10 has an intake manifold 44, with throttle 42, and an exhaust manifold 60 coupled to an emission control device 63. Emission control device 63 includes one or more catalysts and air-fuel ratio sensors, such as described with regard to FIG. 1. As one non-limiting example, engine 10 can be included as part of a propulsion system for a passenger vehicle.

During selected conditions, such as when the full torque capability of the engine is not needed, one or more cylinders, such as one of a first or second cylinder group, may be selected for deactivation (herein also referred to as a VDE mode of operation). Specifically, one or more cylinders may be deactivated by shutting off respective fuel injectors while commanding intake and exhaust valves closed. While fuel injectors of the disabled cylinders are turned off, the remaining enabled cylinders continue to carry out combustion with fuel injectors active and operating. To meet torque requirements, the engine may produce the same amount of torque on those cylinders for which the injectors remain enabled. This may require higher manifold pressures, resulting in lowered pumping losses and increased engine efficiency. Also, the lower effective surface area (from only the enabled cylinders) exposed to combustion reduces engine heat losses, improving the thermal efficiency of the engine. In alternate examples, engine system 10 may have cylinders with selectively deactivatable intake and/or exhaust valves wherein deactivating the cylinder includes deactivating the intake and/or exhaust valves.

Cylinders may be grouped for deactivation in a bank-specific manner. For example, in FIG. 2, the first group of cylinders may include the three cylinders of the first bank 215a while the second group of cylinders may include the three cylinders of the second bank 215b. In an alternate example, instead of one or more cylinders from each bank being deactivated together, two cylinders from each bank of the V6 engine may be selectively deactivated together. In still another example, only one cylinder may be deactivated. In still other examples, as will be discussed in detail below, any number of cylinders may be deactivated and fuel may be injected to the deactivated cylinder(s), in order to conduct a diagnostic routine to determine whether intake air oxygen sensor(s) (e.g. 43a, 43b) are functioning as desired.

Engine 10 may operate on a plurality of substances, which may be delivered via fuel system 18. Engine 10 may be controlled at least partially by a control system including controller 12. As discussed above, controller 12 may receive various signals from sensors 117 coupled to engine 10, and send control signals to various actuators 118 coupled to the engine and/or vehicle.

Fuel system 18 may be further coupled to a fuel vapor recovery system (not shown here but see FIG. 1) including one or more canisters for storing refueling and diurnal fuel vapors. During selected conditions, one or more valves of the fuel vapor recovery system may be adjusted to purge the stored fuel vapors to the engine intake manifold to improve fuel economy and reduce exhaust emissions. In one example, the purge vapors may be directed near the intake valve of specific cylinders. For example, during a VDE mode of operation, purge vapors may be directed only to the cylinders that are firing. This may be achieved in engines configured with distinct intake manifolds for distinct groups of cylinders. Alternatively, one or more vapor management valves may be controlled to determine which cylinder gets the purge vapors.

Controller 12 may receive an indication of cylinder knock or pre-ignition from one or more knock sensors 282 distributed along the engine block. When included, the plurality of knock sensors may be distributed symmetrically or asymmetrically along the engine block. As such, the one or more knock sensors 282 may be accelerometers, or ionization sensors.

Figure 3A:
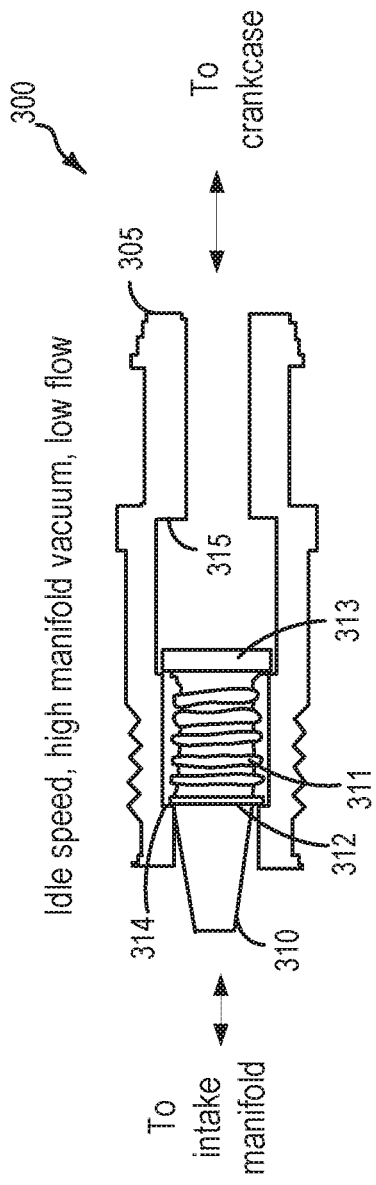
FIG. 3A illustrates a position of a PCV valve during idle speed, high intake manifold vacuum conditions.
Figure 3B:
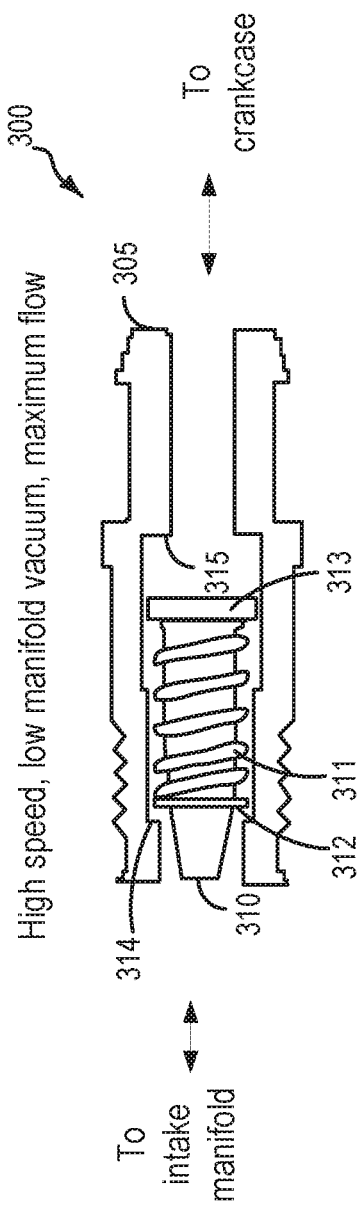
FIG. 3B illustrates a position of a PCV valve during high speed, low intake manifold vacuum conditions.
Figure 3C:
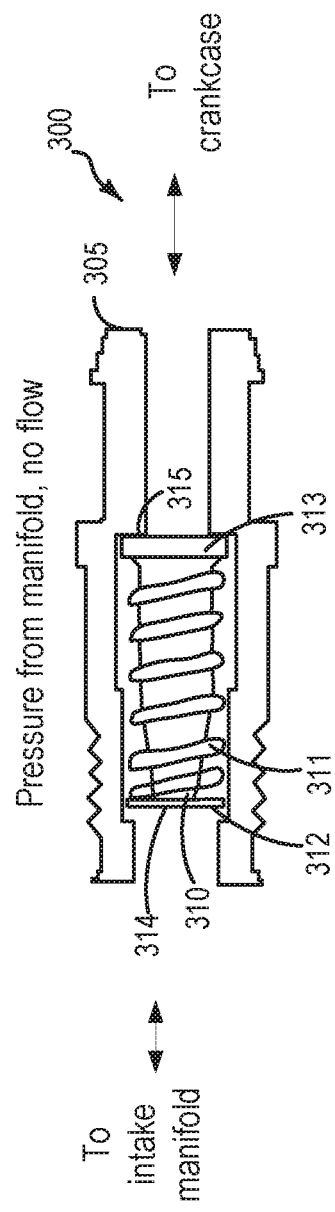
FIG. 3C illustrates a position of a PCV valve during conditions of positive intake manifold pressure conditions.

Turning now to FIGS. 3A-3C, example illustrations of various conformations of a passive PCV valve (e.g. 78) during various engine operating conditions, is shown. More specifically, FIG. 3A illustrates a PCV valve 300 (e.g. 78) conformation during idle speed, high intake manifold vacuum conditions. FIG. 3B illustrates a conformation of PCV valve 300 (e.g. 78) during high speed, low intake manifold conditions. FIG. 3C illustrates a conformation of PCV valve 300 (e.g. 78) during conditions of positive pressure with respect to atmospheric pressure in the intake manifold. It may be understood that PCV valve 300 depicted at FIGS. 3A-3C may comprise the same PCV valve as PCV valve 78 depicted above at FIG. 1.

Turning to FIG. 3A, PCV valve 300 may include a PCV valve housing 305, a plunger 310, and a spring 311. Furthermore, PCV valve 300 may include a first pintle 312, and a second pintle 313. Responsive to conditions of idle speed and high intake manifold vacuum, the high intake manifold vacuum may draw the plunger 310 toward the intake manifold, resulting in the first pintle 312 seating against a first valve seat 314. As such, under high intake manifold vacuum conditions, PCV valve 300 adopts a low flow conformation. In other words, fluid flow from the crankcase may be prevented as a result of the first pintle 312 seating against the first valve seat 314.

Turning to FIG. 3B, PCV valve 300 is illustrated under conditions of high engine speed, and low intake manifold vacuum. Responsive to conditions of high engine speed, and low intake manifold vacuum, spring 311 may push first pintle 312 away from first valve seat 314, thus allowing more fluid flow. Furthermore, second pintle 313 may not contact second valve seat 315, and as such, a high engine speed, low intake manifold vacuum condition may represent a condition where fluid flow through PCV valve 300 is the least restricted.

While the above-described condition for the least restricted fluid flow discusses high engine speed, it may be understood that in some examples, engine speed may not be necessarily high, for example under conditions where the throttle (e.g. 42) is commanded open (e.g. fully open), as will be discussed in further detail below.

Turning to FIG. 3C, PCV valve 300 is illustrated under conditions of positive intake manifold pressure. Under such conditions, PCV valve 300 may close. More specifically, positive pressure in the intake manifold may result in second pintle 313 seating against second valve seat 315, thus preventing fluid flow from the intake manifold to the crankcase.

As discussed above, the PCV valve may occupy different configurations as a function of intake manifold pressure. As such, by actively controlling pressure in the intake manifold, the PCV may be controlled to a least restricted, or open position. Such control may be useful for a diagnostic routine that includes routing fluid flow comprising un-combusted hydrocarbons to the intake manifold, in order to rationalize the intake air oxygen sensors (e.g. 43a and/or 43b), as will be discussed in detail below.

Thus, the systems described above with regard to FIGS. 1-3C may enable a system for a hybrid vehicle, comprising an engine system that includes a variable displacement engine, an intake passage, an intake manifold, an exhaust, a set of cylinders, a set of pistons coupled to the set of cylinders, the set of pistons including piston rings. The engine system may further include intake and exhaust valves mechanically coupled to each cylinder of the set of cylinders, a first variable displacement engine actuator configured to control position of the intake valves and a second variable displacement engine actuator configured to control position of the exhaust valves. The engine system may further include a set of fuel injectors, each fuel injector of the set configured to provide fuel to each of the cylinders of the set of cylinders, and an engine temperature. The system for the hybrid vehicle may further include a crankcase ventilation system including a crankcase, a conduit selectively fluidically coupling the crankcase to the intake manifold, and a positive crankcase ventilation valve positioned in the conduit. The system for the hybrid vehicle may further include a motor configured to rotate the engine, a first intake air oxygen sensor positioned in the intake manifold, a second intake air oxygen sensor positioned in the intake passage, and a throttle positioned in the intake passage between the first intake air oxygen sensor and the second intake air oxygen sensor. The system for the hybrid vehicle may further include a controller, the controller storing instructions in non-transitory memory that, when executed, cause the controller to, with engine temperature below a threshold engine temperature, command fully open the throttle, and rotate the engine in a forward direction fueled but without spark and with the intake and exhaust valves operating to open and close, to obtain a first baseline response of the first intake air oxygen sensor and a second baseline response of the second intake air oxygen sensor. The controller may store further instructions to seal the cylinders while maintaining fueling to the cylinders and maintaining rotating the engine in the forward direction subsequent to obtaining the first and second baseline responses. In such an example, sealing the cylinders may include closing the intake valves via the first variable displacement engine actuator, and closing the exhaust valves via the second variable displacement engine actuator. Furthermore, sealing the cylinders may route un-combusted hydrocarbons from the injected fuel past the piston rings and through the conduit to the intake manifold via the positive crankcase ventilation valve. The un-combusted hydrocarbons may be routed to the intake manifold via the positive crankcase ventilation valve, where the positive crankcase ventilation valve may occupy an open configuration as a result of the throttle being commanded fully open. The controller may store further instructions to diagnose whether the first intake air oxygen sensor and the second intake air oxygen sensor are functioning as desired based at least in part on the routing of un-combusted hydrocarbons to the intake manifold.

In such a system for a hybrid vehicle, the controller may store further instructions to diagnose the first intake air oxygen sensor by indicating the first intake air oxygen sensor is functioning as desired in response to a first threshold response of the first intake air oxygen sensor being reached while the engine is rotating in the forward direction with the cylinders sealed, the first threshold response a function of the first baseline response. The controller may still further store instructions to diagnose the second intake air oxygen sensor by first diagnosing the first intake air oxygen sensor, then stopping rotating the engine in the forward direction to allow for the un-combusted hydrocarbons to migrate to the second intake air oxygen sensor, where it may be indicated that the second intake air oxygen sensor is functioning as desired responsive to a second threshold response of the second intake air oxygen sensor being reached while the engine is stopped from rotating.

In such a system, the system may further comprise a fuel vapor storage canister positioned in an evaporative emissions system of the vehicle, a canister purge valve positioned in a purge conduit between the intake manifold and the fuel vapor storage canister, and a vacuum pump positioned in a vent line between the fuel vapor storage canister and atmosphere. In such an example, the controller of the system may store further instructions to remove the un-combusted hydrocarbons to either the exhaust or to the fuel vapor storage canister subsequent to diagnosing the first and second intake air oxygen sensors. For example, removing the un-combusted hydrocarbons to the exhaust may involve rotating the engine unfueled in the forward direction with the intake and exhaust valves operating to open and close, and where removing the un-combusted hydrocarbons to the fuel vapor storage canister may include commanding open the canister purge valve, and operating the vacuum pump to draw the un-combusted hydrocarbons from the intake passage and intake manifold to the fuel vapor storage canister.

Turning now to FIG. 4, a high-level flowchart for an example method 400 for conducting an IAO2 sensor diagnostic, is shown. More specifically, method 400 may be utilized under conditions of a cold-start (e.g. engine temperature below a threshold engine temperature) where piston rings of piston(s) of individual engine cylinders are cold, thus resulting in an inefficient sealing ability of such piston rings with cylinder walls. By sealing cylinders of the engine and injecting fuel (but without spark) into the sealed cylinders, un-combusted hydrocarbons (also referred to as un-combusted fuel vapor) may migrate to the crankcase. If a PCV valve (e.g. 78) is open, then such un-combusted hydrocarbons may be routed to the intake manifold, where, if the first IAO2 sensor (e.g. 43a) is functioning as desired, an IAO2 response greater than a first IAO2 threshold may be indicated. Alternatively, if the IAO2 response is below the first IAO2 threshold, then it may be indicated that the first IAO2 sensor is not functioning as desired. Method 400 will be described with reference to the systems described herein and shown in FIGS. 1-3C, though it will be appreciated that similar methods may be applied to other systems without departing from the scope of this disclosure. Instructions for carrying out method 400 and the rest of the methods included herein may be executed by a controller, such as controller 12 of FIG. 1, based on instructions stored in non-transitory memory, and in conjunction with signals received from sensors of the engine system, such as temperature sensors, pressure sensors, and other sensors described in FIGS. 1-3C. The controller may employ actuators such as motor/generator (e.g. 152), throttle (e.g. 42), fuel injector(s) (e.g. 45), first VDE actuator (e.g. 83) second VDE actuator (e.g. 84), etc., according to the methods described herein.

Method 400 begins at 405, and may include evaluating current vehicle operating conditions. Operating conditions may be estimated, measured, and/or inferred, and may include one or more vehicle conditions, such as vehicle speed, battery state of charge, etc., various engine conditions, such as engine status (on or off), engine load, engine temperature, engine speed, torque demand, exhaust air-fuel ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 410, method 400 may include indicating whether conditions are met for conducting an IAO2 diagnostic. Conditions being met for conducting the IAO2 diagnostic may include an indication that engine temperature is below a threshold engine temperature. The threshold engine temperature may comprise a temperature of the engine where a sealing ability of piston ring(s) coupled to piston(s) of engine cylinder(s) is inefficient, or non-optimal. In other words, conditions being met for conducting the IAO2 diagnostic may include an indication of a cold-start event. Conditions being met for conducting the IAO2 diagnostic may additionally or alternatively include an indication that first IAO2 sensor (e.g. 43a) and/or second IAO2 sensor (e.g. 43b) are potentially not functioning as desired. For example, air/fuel ratio may be different than expected during a canister purging operation under conditions where the first IAO2 sensor is not functioning as desired. In another example, degraded combustion events may be indicative of the second IAO2 sensor not functioning as desired, when exhaust gas recirculation (EGR) is employed.

In some examples, conditions being met at 410 may additionally or alternatively include an indication that the PCV system, or crankcase ventilation system (e.g. 16), is not degraded. In other words, conditions being met may include an indication that the PCV valve (e.g. 78) is functioning as expected or desired. More specifically, a stuck open or stuck closed PCV valve may in some examples result in driveability issues, which may include hesitation, surges, etc. A stuck open PCV valve may result in surges at engine idle, the result of vapors being drawn from the crankcase to the intake manifold, as the air/fuel ratio is sensitive to vapor concentrations at engine idle conditions. Accordingly, conditions being met at 410 may include an indication of an absence of issues potentially related to PCV system degradation.

Additionally or alternatively, conditions being met at 410 may include an indication of an absence of degradation related to the engine, where the engine comprises a variable displacement engine (VDE), discussed above. More specifically, conditions being met at 410 may include an indication that first VDE actuator (e.g. 83) and second VDE actuator (e.g. 84) are functioning as expected or desired. For example, degradation in valve deactivation may be identified based on an indicated pressure difference between an expected and an actual cylinder air charge manifold absolute pressure during VDE modes, and the absence of such a pressure difference during non-VDE modes of operation, where actual cylinder air charge may be inferred from a measured engine rotational speed, air mass flow, air and coolant temperature, and barometric pressure, for example. In another example, degradation of the first or second VDE actuator may be indicated via, in response to a change in engine displacement, establishing a current crankshaft acceleration pattern, comparing the current crankshaft acceleration pattern with a predefined expected crankshaft acceleration pattern (where the actuator(s) are functioning as desired) and a predefined degraded crankshaft acceleration pattern, where degradation is indicated based on said comparison.

In still other examples, conditions being met at 410 may include an indication that an IAO2 sensor (e.g. 43a and/or 43b) has not been diagnosed for a predetermined period of time, where the predetermined period of time may comprise 5 days, 10 days, 20 days, 30 days, etc.

In still other examples, conditions being met at 410 may additionally or alternatively include a scheduled wake-up of the controller where one or more of the above-mentioned conditions are also indicated to be met.

In still other examples, conditions being met at 410 may additionally or alternatively include an indication that the fuel vapor storage canister (e.g. 90), is substantially clean (e.g. less than 5% full of fuel vapors, or less than 1% full of fuel vapors). For example, if the canister were not substantially clean, then a purging event may be utilized to rationalize at least the first IAO2 sensor (e.g. 43a). However, when the fuel vapor canister is substantially clean, then such a purging routine may not be utilized to rationalize the IAO2 sensor. Furthermore, in such an example, the second IAO2 sensor (e.g. 43b) may not be effectively rationalized via a purging operation, as the purge vapors are routed to engine intake downstream of the second IAO2 sensor.

If at 410, conditions are not indicated to be met for conducting the IAO2 diagnostic, method 400 may proceed to 415. At 415, method 400 may include maintaining current vehicle operating conditions. For example, if the vehicle is in operation, being propelled via the engine, some combination of the engine and electrical power, or in an electric-only mode of operation, such operational conditions may be maintained. If the vehicle is off but conditions are not indicated to be met for conducting the diagnostic, then the vehicle may be maintained off. Method 400 may then end.

Returning to 410, in response to conditions being met for conducting the IAO2 diagnostic, method 400 may proceed to 420. At 420, method 400 may include spinning the engine fueled (where fuel is injected into the engine cylinders during the spinning) but without providing spark to engine cylinders, for a first predetermined duration. The first predetermined duration may comprise a duration sufficient to establish a baseline IAO2 sensor reading, where the baseline IAO2 sensor reading may include a first IAO2 sensor (e.g. 43a) baseline and a second IAO2 sensor (e.g. 43b) baseline (also referred to herein as first baseline and second baseline, or first baseline response and second baseline response). The engine may be spun or rotated unfueled via a motor (e.g. 152), for example. More specifically, the controller (e.g. 12) may send a signal to the motor, actuating it to rotate the engine. It may be understood that rotating the engine at 420 may include rotating the engine in a direction that is the same direction as the engine rotates when the engine is combusting air and fuel. In other words, rotating the engine at 420 may include rotating the engine in a forward, or default direction.

At 420, fuel injection may be provided during an exhaust stroke for each particular cylinder. Furthermore, it may be understood that rotating the engine at 420 may include the intake and exhaust valves coupled to each engine cylinder, opening and closing as a function of engine cycle. More specifically, the intake valve(s) may open during an intake stroke, and the exhaust valve(s) may open during an exhaust stroke. By injecting fuel into the cylinder(s) during the exhaust stroke, it may be understood that a vast majority of un-combusted hydrocarbons may be expelled to the exhaust manifold. Some fuel that is injected may migrate as un-combusted hydrocarbons to the crankcase as the piston rings sealing ability is non-optimal, however such an amount may not be enough to excite the first and/or second IAO2 sensor(s) (e.g. where exciting the first and/or second IAO2 sensor(s) may include an indication of a reduction in oxygen concentration in the vicinity of the first and/or second IAO2 sensor(s), the reduction in oxygen concentration due to increase hydrocarbon concentration). In other words, the vast majority of the injected fuel at 420 may be expelled as un-combusted hydrocarbons to the exhaust system. In this way, the first and second baseline IAO2 responses may be obtained at 420.

At 420, method 400 may additionally include commanding the intake throttle (e.g. 42) to a fully open configuration. By commanding the throttle to the fully open configuration, pressure in the intake manifold may be controlled to be near atmospheric pressure. With the absence of substantial positive or negative pressure (with respect to atmospheric pressure) in the intake manifold, it may be understood that the PCV valve (e.g. 78) may be in a least restricted, or open configuration (see FIG. 3B). With the PCV valve in such a position, any un-combusted hydrocarbons resulting from fuel being injected at 420 that may make its way to the crankcase, may be routed to the IAO2 sensor(s). However, as discussed, because the intake and exhaust valve(s) for each cylinder are operating to open/close, the amount of un-combusted hydrocarbons that may make its way to the IAO2 sensor(s) may be insufficient to excite the IAO2 sensor(s).

Baseline IAO2 measurements at 420 may include periodic readings from each of the first IAO2 sensor and second IAO2 sensor. For example, a reading may be taken for each sensor every 1 second, every 2 seconds, every 5 seconds, etc. The readings may be obtained in response to the IAO2 sensor readouts stabilizing, in some examples. The periodic readings may in some examples be processed (e.g. averaged) via the controller to obtain baseline IAO2 flow for each of the first IAO2 sensor and the second IAO2 sensor.

In some examples, each and every engine cylinder may receive fuel during the spinning at 420, whereas in other examples, any number of engine cylinders may receive fuel during the spinning at 420.

As discussed, rotating the engine at 420 may proceed for a first predetermined duration. Accordingly, at 425, method 400 may include indicating whether the first predetermined duration has elapsed. If not, the engine may be continued to be spun fueled but without spark until the first predetermined duration elapses.

Responsive to the first predetermined duration elapsing at 425, method 400 may proceed to 430, and may include sealing the cylinders that received fuel at step 420 of method 400. More specifically, each of the cylinders (which in some examples may include all cylinders) that received fuel at 420, may be commanded sealed. For example, sealing the engine cylinders at 430 may include the controller sending a signal to the first VDE actuator (e.g. 83) commanding the intake valve(s) closed, and may further include sending a signal to the second VDE actuator (e.g. 84), actuating the exhaust valve(s) closed. In this way, it may be understood that each cylinder of the engine that received fuel at 420, may be sealed.

Sealing the cylinders at 430 may further include maintaining the throttle in the fully open configuration, in order to maintain the PCV valve in its least restrictive configuration. Furthermore, the engine may be maintained rotating in the forward, or default direction. Still further, fuel injection to the sealed cylinders may be maintained, without spark. It may be understood that, with the cylinders sealed, under conditions where fuel injection to the sealed cylinders is maintained, un-combusted hydrocarbons cannot exit to the exhaust but rather, due to the inefficient sealing ability of piston rings, un-combusted hydrocarbons may make their way to the crankcase (e.g. 28). Once in the crankcase, due to the engine rotation and further responsive to the PCV valve being in its least restrictive configuration by virtue of the fully open throttle, un-combusted hydrocarbons may be routed through the PCV line, or conduit (e.g. 76) to the intake manifold (e.g. 44). Un-combusted hydrocarbons in the intake manifold may thus excite the first IAO2 sensor (e.g. 43a) (e.g. the IAO2 sensor may register a rich response, resulting from a decrease in oxygen concentration as a result of the increase in hydrocarbon concentration), provided that the first IAO2 sensor is functioning as desired. Accordingly, with the cylinder(s) sealed and with fuel injection maintained to the sealed cylinder(s), the first IAO2 sensor may be monitored for a second predetermined duration. The second predetermined duration may include an amount of time where, if the IAO2 sensor were functioning as desired, a response would be expected.

Accordingly, proceeding to 440, method 400 may include indicating whether the response of the first IAO2 sensor is greater (e.g. more rich) than a first IAO2 threshold. The first IAO2 threshold may be a predetermined amount greater than the first IAO2 baseline, discussed above. If not, method 400 may proceed to 445, where it may be indicated as to whether the second predetermined duration has elapsed. If the second predetermined duration is not indicated to have elapsed at 445, method 400 may include continuing to monitor the first IAO2 sensor until the second predetermined duration elapses.

Alternatively, if the second predetermined duration is indicated to be elapsed at 445, method 400 may proceed to 450. At 450, method 400 may include indicating that the first IAO2 sensor is not functioning as desired or expected. More specifically, because the first IAO2 response was below the first IAO2 threshold for the predetermined duration, the first IAO2 sensor may be indicated to be degraded. Accordingly, at 450, indicating the first IAO2 sensor is degraded may include storing such an indication at the controller, and may further include setting a malfunction indicator light (MIL) at the vehicle dash, to alert a vehicle operator of a request to service the vehicle.

Returning to 440, in an event that the response of the first IAO2 sensor is greater than the first IAO2 threshold, method 400 may proceed to 470. At 470, method 400 may include indicating that the first IAO2 sensor is functioning as desired. Such an indication may be stored at the controller, for example.

Whether the first IAO2 sensor is indicated to be degraded (step 465), or functioning as desired (step 470), method 400 may proceed to 455. At 455, method 400 may include indicating whether a diagnostic for the second IAO2 sensor (e.g. 43b) is additionally requested. For example, there may be situations where the second IAO2 sensor is not requested to be diagnosed, such as a situation where it is inferred that the second IAO2 sensor is functioning as desired, or in situations where a threshold duration has not elapsed since a prior diagnostic on the second IAO2 sensor, etc.

If, at 455, the second IAO2 sensor diagnostic is requested, method 400 may proceed to FIG. 5, depicting an example method 500 for conducting the second IAO2 sensor diagnostic. Alternatively, if the second IAO2 sensor diagnostic is not requested, method 400 may proceed to 460. At 460, method 400 may include removing un-combusted hydrocarbons from the intake manifold. At 460, removing un-combusted hydrocarbons may be conducted in one of two ways. In one example, fueling to the sealed cylinders may be stopped, via the controller sending a signal to the appropriate fuel injector(s), actuating them off to prevent fuel from being injected to the sealed cylinders. Furthermore, first VDE actuator (e.g. 83) and second VDE actuator (e.g. 84) may be actuated off, via the controller, such that the cylinders that were sealed may resume operation of the intake and exhaust valves. With fueling stopped, and with the cylinders unsealed, the engine may continue to be rotated for a duration, in order to route the hydrocarbons to the exhaust passage (also referred to herein as exhaust), via the engine. The duration may comprise a duration that is a function of how long the hydrocarbons were routed to the intake manifold, how much fuel was injected into the engine cylinders as a function of time, speed of rotation of the engine, etc. In such an example, the un-combusted hydrocarbons may not be effectively processed via emission control devices (e.g. 63), unless said emission control device is raised to its light-off, or operating, temperature. Thus, at 460, method 400 may in some examples include activating an electric heater (e.g. 119), to raise temperature of the emission control device to its operating temperature, just prior to routing the un-combusted hydrocarbons to the exhaust passage. However, in other examples, the electric heater (where included) may not be utilized to raise temperature of the emission control device to its operating temperature prior to routing the un-combusted hydrocarbons to the exhaust. In some examples, an exhaust gas sensor may be utilized in order to indicate when the engine may be stopped from rotating. In other words, when the exhaust gas sensor indicates that further routing of hydrocarbons is unlikely (e.g. hydrocarbon concentration in the intake manifold is below a threshold), then the routing of hydrocarbons to the exhaust may be terminated.

In a second example, the following methodology may be utilized. First, fueling may be stopped to the sealed cylinders, and then subsequently, the engine may be stopped from rotating via the controller commanding the motor to stop rotating the engine. The engine may be stopped from rotating after a duration where it is expected that the un-combusted hydrocarbons resulting from the fuel injected to the cylinders have migrated to the crankcase and to at least past the PCV valve en route to the intake manifold. Next, the ELCM may be activated in vacuum-mode, to draw vacuum on the intake manifold, via the fuel vapor storage canister. Activating the ELCM in vacuum-mode may additionally include commanding open the CPV (e.g. 92), and commanding open the CVV (e.g. 87). The throttle may be maintained open, or in some examples where the second IAO2 sensor was not diagnosed, the throttle may be commanded to a closed position or a position the throttle was in prior to being commanded fully open.

By activating the ELCM in vacuum-mode, un-combusted hydrocarbons in the intake manifold may be routed to the canister, for storage. As discussed above, one of the conditions for entry into the IAO2 sensor diagnostic(s) may comprise an indication that the canister is free from hydrocarbons. Thus, routing un-combusted hydrocarbons to the canister may not result in a situation where bleed emissions are likely. However, in some examples where such a strategy is utilized, if a predetermined period of time goes by without the canister being cleaned of the hydrocarbons stored as a result of the IAO2 sensor diagnostic, then the engine may be pulled up or scheduled to clean the canister of hydrocarbons.

Furthermore, typical canisters for hybrid vehicles with sealed fuel tanks may be designed to have a predetermined capacity, based mainly on capturing refueling vapors. For example, the maximum capacity of the canister may comprise a level where, if the fuel tank were empty and filled to capacity with fuel, the canister may become fully loaded with fuel vapors, but may not become overloaded. Accordingly, any hydrocarbons added to the canister may impact how much fuel may be added to the fuel tank at a refueling event. Thus, if the strategy of routing un-combusted hydrocarbons to the canister after the IAO2 sensor diagnostic is conducted is employed, then the controller may estimate the loading state of the canister, and may illuminate a message at the vehicle dash alerting a vehicle operator of how much fuel may be added to the fuel tank at the next refueling event, to avoid overloading the canister. Such an indication of canister loading state may be a function of temperature change of the canister during the routing of un-combusted hydrocarbons to the fuel vapor storage canister, for example. More specifically, the temperature sensor positioned within the fuel vapor storage canister may be utilized to estimate how much hydrocarbons have been added to the canister as a result of sequestering the un-combusted hydrocarbons from the intake manifold to the canister, and such an estimate may be utilized to inform the vehicle operator of how much fuel may be added to the fuel tank at a subsequent refueling event.

Furthermore, in such an example where the ELCM is activated in vacuum-mode to route un-combusted hydrocarbons to the canister, the negative pressure in the intake manifold may serve to close the PCV valve (e.g. 78), as indicated at FIG. 3A.

In some examples, routing un-combusted hydrocarbons to the canister may be conducted in a situation where an electric heater coupled to the emissions control device is not present, or has been indicated to be degraded, etc. In other examples, routing un-combusted hydrocarbons to the exhaust may include a situation where canister load is greater than a threshold, or where a fuel level is below a predetermined threshold such that it may be likely that a subsequent refueling operation may overload the canister, or where the ELCM is either not included in the vehicle or is indicated to be degraded.

Responsive to removing un-combusted hydrocarbons from the intake manifold at 460, method 400 may proceed to 465. At 465, method 400 may include returning the engine system to its default operating conditions. More specifically, the throttle may be commanded via the controller to its position it was occupying prior to being commanded fully open. Furthermore, the engine may be stopped from rotating, and may be controlled via the motor to a desired position for engine starting.

Continuing to 475, method 400 may include updating vehicle operating parameters, in light of the test diagnostic having been conducted on the first IAO2 sensor. For example, updating vehicle operating parameters at 475 may include not changing current operating parameters in response to the indication that the first IAO2 sensor is functioning as desired. Alternatively, responsive to an indication that the first IAO2 sensor is not functioning as desired, updating current operating parameters at 475 may include updating a canister purge schedule such that any purging of the canister may rely primarily on feedback control via, for example, an exhaust gas sensor, rather than feedforward control. In some examples, purging of the canister may be avoided as much as possible, until it is indicated that the issues related to the first IAO2 sensor have been mitigated. Method 400 may then end.

Returning to 455, responsive to an indication that the test diagnostic for the second IAO2 sensor is desired or requested, method 400 may proceed to FIG. 5.

Thus, turning now to FIG. 5, a high-level flowchart for an example method 500 for conducting a diagnostic on the second IAO2 sensor (e.g. 43b), is shown. Method 500 proceeds from step 455 of method 400, and thus method 500 will be described with reference to the systems described herein and shown in FIGS. 1-3C, though it will be appreciated that similar methods may be applied to other systems without departing from the scope of this disclosure. Instructions for carrying out method 500 and the rest of the methods included herein may be executed by a controller, such as controller 12 of FIG. 1, based on instructions stored in non-transitory memory, and in conjunction with signals received from sensors of the engine system, such as temperature sensors, pressure sensors, and other sensors described in FIGS. 1-3C. The controller may employ actuators such as motor/generator (e.g. 152), throttle (e.g. 42), fuel injector(s) (e.g. 45), first VDE actuator (e.g. 83) second VDE actuator (e.g. 84), etc., according to the methods described herein.

At 505, method 500 may include routing un-combusted hydrocarbons to the second IAO2 sensor (e.g. 43b). Routing un-combusted hydrocarbons to the second IAO2 may comprise one or both of two methodologies.

In one example, referred to as a first strategy, routing un-combusted hydrocarbons to the second IAO2 sensor may include the controller sending a signal to the motor, actuating it to stop rotation of the engine. The engine may thus spin to rest. With the engine at rest, the throttle may be maintained open. With the throttle open, the un-combusted hydrocarbons may migrate in the direction of fresh air, which may comprise migration through the intake passage toward the second IAO2 sensor.

In another example, referred to as a second strategy, routing un-combusted hydrocarbons to the second IAO2 sensor may include the controller sending a signal to the motor, actuating it to stop rotation of the engine, such that the engine may spin to rest. Subsequent to the engine spinning to rest, the motor may be controlled via the controller to reverse rotation of the engine, such that the engine may be spun in the reverse direction, which may serve to route un-combusted hydrocarbons in the direction of the second IAO2 sensor, and which may further generate a pressure in the intake manifold, which may serve to close the PCV valve (see FIG. 3C). In this way, un-combusted hydrocarbons may be routed to the second IAO2 sensor, but may be prevented from being routed through the PCV line (e.g. 76) in the direction of the crankcase. It may be understood that spinning the engine in the reverse direction includes unsealing the cylinders, such that the intake and exhaust valves function to open and close which may generate a vacuum in the exhaust and the positive pressure in the intake manifold.

In some examples, the first strategy may be employed initially, where the engine is simply spun to rest and the un-combusted hydrocarbons may migrate toward the second IAO2 sensor. If a predetermined duration elapses without a response, then the second strategy may be employed to actively route the un-combusted hydrocarbons in the direction of the second IAO2 sensor.

In some examples, the first strategy may be employed if a state of charge of an onboard energy storage device is lower than a threshold SOC. For example, because rotating the engine in reverse utilizes energy from the onboard energy storage device, such a strategy may be employed if downstream applications (e.g. engine starting, etc.) that utilize energy stored in the onboard energy storage device, will not be adversely impacted by such reverse rotation.

In discussing example method 500, it may be understood that routing un-combusted hydrocarbons to the second IAO2 sensor may include rotating the engine in reverse. Such reverse rotation may be accomplished via an H-bridge circuit, for example, that enables the motor to reverse direction, thus enabling the engine to be rotated in reverse.

Furthermore, it may be understood that rotating the engine in reverse may include rotating the engine without fueling and without providing spark, and where intake and exhaust valves coupled to each cylinder operate to open and close during the rotating, as discussed above.

Accordingly, responsive to routing the un-combusted hydrocarbons to the second IAO2 sensor, method 500 may proceed to 510. At 510, method 500 may include indicating whether the second IAO2 sensor response is greater than a second IAO2 threshold. The second IAO2 threshold may comprise a threshold a predetermined amount greater than the second IAO2 sensor baseline.

If, at 510, the second IAO2 sensor response is not greater than the second IAO2 threshold, then method 500 may proceed to 515. A 515, method 500 may include indicating whether a third predetermined duration has elapsed. The third predetermined duration may comprise a duration where, with the engine rotating in reverse, it may be expected that the second IAO2 sensor may respond, provided that the second IAO2 sensor is functioning as desired.

If, at 515, the third predetermined duration has not elapsed, method 500 may return to 510, where the second IAO2 sensor may continue to be monitored. Alternatively, if at 515 the third predetermined duration is indicated to have elapsed, method 500 may proceed to 520. At 520, method 500 may include indicating that the second IAO2 sensor is not functioning as desired. Such a result may be stored at the controller, for example. Indicating the second IAO2 sensor is not functioning as desired, or is degraded, at 520 may further include storing such a result at the controller, and may include illuminating a malfunction indicator light (MIL) at the vehicle dash, alerting the vehicle operator of a request to service the vehicle.

Alternatively, returning to 510, if the second IAO2 response is greater than the second IAO2 threshold, method 500 may proceed to 525. At 525, method 500 may include indicating the second IAO2 sensor is functioning as desired. Such a result may be stored at the controller, for example.

Whether the second IAO2 sensor is indicated to be functioning as desired (step 525), or not (step 520), method 500 may proceed to 530. At 530, method 500 may include removing un-combusted hydrocarbons from the intake. Removing un-combusted hydrocarbons from intake has been discussed in detail above with regard to step 460 of method 400, and thus will not be reiterated here for brevity. Briefly, un-combusted hydrocarbons may be removed via rotating the engine unfueled in the forward or default direction with intake and exhaust valves opening/closing, or may include routing the un-combusted hydrocarbons to the fuel vapor storage canister via activation of the ELCM pump in vacuum-mode. Routing the hydrocarbons to the exhaust may in some examples include electrically raising temperature of the emissions control device to its operational temperature (e.g. light-off temperature), an indication of a degraded or non-existent ELCM, an indication of canister load above a threshold load, etc. Alternatively, routing the hydrocarbons to the canister may include canister load below the threshold load, an absence of an electric heater for raising temperature of the emissions control device or an indication that the electric heater (e.g. 119) is not functioning as desired, etc.

In some examples, as discussed above, if the first IAO2 sensor is not indicated to be functioning as desired, then a purge schedule may be updated such that purging is avoided until the issues related to the first IAO2 sensor have been mitigated. Thus, in such an example where the first IAO2 sensor is degraded, it may be undesirable to remove uncombusted hydrocarbons from the intake by routing them to the canister. Thus, in a case where the first IAO2 sensor is indicated to be degraded, then removing uncombusted fuel from the intake may include routing said uncombusted fuel to the exhaust, whether or not the electric heater for the catalyst is present/non-degraded, or not.

Responsive to removing uncombusted hydrocarbons from the intake at 530, method 500 may proceed to 535. At 535, method 500 may include returning the engine to default operating conditions. For example, the throttle may be commanded to a position the throttle was in prior to being commanded open, the ELCM may be turned off and the CPV may be commanded closed (where each are applicable), the electric heater may be turned off (where applicable), the motor may be commanded via the controller to stop rotation of the engine (where applicable), etc.

Proceeding to 540, method 500 may include updating vehicle operating parameters to reflect the results of the diagnostic for the first IAO2 sensor and the second IAO2 sensor. As discussed above at 475, responsive to the first IAO2 sensor being indicated to be degraded, updating vehicle operating parameters may include updating a canister purge schedule such that any purging of the canister may rely primarily on feedback control via, for example, an exhaust gas oxygen sensor, rather than feedforward control. In some examples, purging of the canister may be avoided as much as possible, until it is indicated that the issues related to the first IAO2 sensor have been mitigated. Similarly, if the second IAO2 sensor is additionally or alternatively indicated to be degraded, then updating vehicle operating parameters may include avoiding exhaust gas recirculation during engine operation as much as possible. In other words, the vehicle may be employed to be propelled as much as possible in an electric-only mode of operation, or if the use of the engine is requested, operating the engine such that use of exhaust gas recirculation may be avoided as much as possible. Method 500 may then end.

While not explicitly illustrated, in some examples if both the first IAO2 sensor and the second IAO2 sensor fail to respond to the first and second thresholds, respectively, during the IAO2 diagnostic, rather than indicate that both the first and second IAO2 sensors are not functioning as desired, it may be indicated that there may be another reason(s) for such results. For example, it may be unlikely that both the first and second IAO2 sensors fail simultaneously. Thus, in such an example, it may be indicated that there may be a potential issue with the second VDE actuator (e.g. 84). In other words, the exhaust valves may not be effectively sealed, thus resulting in un-combusted hydrocarbons being routed to the exhaust, rather than to the intake manifold, when the cylinders are sealed and with fuel injection maintained to the cylinders. In some examples, indicating such a result may further comprise an indication that un-combusted hydrocarbons are predominantly being routed to the exhaust, via an exhaust gas sensor. Thus, in some examples where neither the first nor second IAO2 sensor is indicated to be functioning as desired, a MIL may be illuminated at the vehicle dash alerting the vehicle operator of the potential degradation of components of the VDE, etc.

Thus, the systems of FIGS. 1-3C and the methods of FIGS. 4-5 may enable a method comprising injecting fuel into one or more cylinders of an engine of a vehicle without combustion, and routing un-combusted hydrocarbons from the one or more cylinders to a crankcase of the engine, the crankcase included in a crankcase ventilation system, and then to an intake manifold of the engine, in order to diagnose whether a first intake air oxygen sensor positioned in the intake manifold is functioning as desired. In an example of the method, actively routing un-combusted hydrocarbons may further comprise rotating the engine in a forward direction via a motor configured to rotate the engine, without providing spark to the one or more cylinders, and where the forward direction comprises a same direction of rotation as when the engine is operating to combust air and fuel.

Such a method may further comprise commanding fully open a throttle configured to control an amount of air inducted to the engine during conditions of engine operation, for example. More specifically, commanding fully open the throttle may control pressure in the intake manifold such that a positive crankcase valve positioned in a conduit coupling the crankcase to the intake manifold may occupy a least-restrictive position.

In such a method, actively routing un-combusted hydrocarbons may further comprise sealing the one or more cylinders of the engine. For example, sealing the one or more cylinders of the engine may include commanding intake and exhaust valves coupled to each of the one or more cylinders of the engine to fully closed positions. More specifically, the engine may comprise a variable displacement engine, where commanding the intake and exhaust valves coupled to each of the one or more cylinders to the fully closed positions may involve actuating a first variable displacement engine actuator and actuating a second variable displacement engine actuator.

In such a method, actively routing un-combusted hydrocarbons may further comprise a temperature of the engine being below a threshold engine temperature where one or more piston rings coupled to pistons of the one or more cylinders of the engine are inefficient at sealing the one or more cylinders from the crankcase.

In such a method, subsequent to the actively routing un-combusted hydrocarbons to the intake manifold of the engine, the method may include routing the un-combusted hydrocarbons to a position upstream of the intake manifold of the engine, to diagnose whether a second intake air oxygen sensor positioned in an intake passage of the engine is functioning as desired. As such, the method may further comprise indicating the first intake air oxygen sensor is functioning as desired provided the first intake air oxygen sensor responds to the actively routed un-combusted hydrocarbons with a first output above a first threshold. Such a method may still further comprise indicating the second intake air oxygen sensor is functioning as desired provided the second intake air oxygen sensor responds to the un-combusted hydrocarbons with a second output above a second threshold. In an example, the first threshold and the second threshold may be a function of a first baseline and a second baseline, where the first baseline and the second baseline may be established under conditions where the un-combusted hydrocarbons are not routed to the crankcase of the engine and then to the intake manifold of the engine.

Such a method may further comprise removing the un-combusted hydrocarbons from the intake passage and/or the intake manifold subsequent to the indicating whether the first intake air oxygen sensor and/or the second intake air oxygen sensor is functioning as desired, where removing the un-combusted hydrocarbons includes routing the un-combusted hydrocarbons to an exhaust of the engine, or routing the un-combusted hydrocarbons to a fuel vapor storage canister configured to store fuel vapor from a fuel tank that provides fuel to the engine.

The systems of FIGS. 1-3C and the methods of FIGS. 4-5 may enable another method comprising spinning an engine of a vehicle in a forward direction while providing fuel injection but not spark and operating the engine in a first mode, to obtain a first baseline response of a first intake air oxygen sensor positioned in an intake manifold of the engine and to obtain a second baseline response of a second intake air oxygen sensor positioned in an intake passage upstream of the intake manifold. In such a method, subsequent to obtaining the first baseline response and the second baseline response, the method may include maintaining spinning the engine in the forward direction with fuel injection but not spark and operating the engine in a second mode, to route un-combusted hydrocarbons to the first intake air oxygen sensor and the second intake air oxygen sensor via a crankcase ventilation system. Such a method may still further include indicating whether the first intake air oxygen sensor and the second intake air oxygen sensor are functioning as desired based on whether a response of the first intake air oxygen sensor during operating the engine in the second mode is greater than a first threshold and whether a response of the second intake air oxygen sensor during operating the engine in the second mode is greater than a second threshold, the first and second thresholds set as a function of the first and second baseline responses.

In an example of the method, routing the un-combusted hydrocarbons to the first intake air oxygen sensor and the second intake air oxygen sensor via the crankcase ventilation system may include the un-combusted hydrocarbons being routed to a crankcase and then to the first intake air oxygen sensor and the second intake air oxygen sensor, and where operating the engine in the first mode and the second mode further comprises an engine temperature below a threshold engine temperature.

In another example of the method, the engine may comprise a variable displacement engine, where operating the engine in the first mode may include intake and exhaust valves coupled to cylinders of the engine operating to open and close, and where operating the engine in the second mode may include sealing the cylinders via commanding fully closed the intake and exhaust valves coupled to the cylinders of the engine.

In such a method, indicating whether the second intake air oxygen sensor is functioning as desired may further comprise first diagnosing the first intake air oxygen sensor while operating the engine in the second mode, and then diagnosing the second intake air oxygen sensor by stopping spinning the engine in the forward direction, to allow the un-combusted hydrocarbons to migrate to the second intake air oxygen sensor in order to diagnose the second intake air oxygen sensor. In such an example, in response to a predetermined duration of time elapsing between stopping spinning the engine in the forward direction and without the response of the second intake air oxygen sensor being greater than the second threshold, the method may include rotating the engine unfueled in a reverse direction opposite the forward direction, to route the un-combusted hydrocarbons to the second intake air oxygen sensor in order to indicate whether the second intake air oxygen sensor is functioning as desired.

In such a method, spinning the engine in the forward direction and operating the engine in the first mode, and spinning the engine in the forward direction and operating the engine in the second mode, may both further comprise controlling pressure in the intake manifold via commanding fully open an intake throttle positioned upstream of the first intake air oxygen sensor but downstream of the second intake air oxygen sensor. In such an example, commanding fully open the intake throttle may result in a positive crankcase ventilation valve positioned in a conduit of the crankcase ventilation system adopting an open configuration, the open configuration enabling the routing of un-combusted hydrocarbons to the first intake air oxygen sensor and the second intake air oxygen sensor via the crankcase ventilation system.

Turning now to FIG. 6, and example timeline 600 for conducting a diagnostic for determining whether a first IAO2 sensor (e.g. 43a) and second IAO2 sensor (e.g. 43b) are functioning as expected or desired. Timeline 600 include plot 605, indicating whether conditions are met for conducting such diagnostics, over time. Timeline 600 further includes plot 610, indicating engine status, over time. The engine may be rotating in the forward direction (fwd), reverse direction (rev), or may not be rotating (off). Timeline 600 further includes plot 615, indicating throttle (e.g. 42) position status, over time. Timeline 600 further includes plot 620, indicating a response of the first IAO2 sensor, and plot 625, indicating a response of the second IAO2 sensor, over time. For both the first IAO2 sensor and the second IAO2 sensor, the sensors may indicate a more "rich" condition as a concentration of hydrocarbons sensed by the sensors increase, and a more "lean" condition as a concentration of hydrocarbons sensed by the sensors decrease (e.g. oxygen concentration increases). Timeline 600 further includes plot 630, indicating a status of fuel injection (on or off) to engine cylinders, over time. Timeline 600 further includes plot 635, indicating VDE status of the engine, over time. More specifically, it may be understood that "on" refers to selected cylinders being sealed, whereas "off" refers to selected cylinders not being sealed. Sealing the particular cylinders may include the controller actuating a first VDE actuator (e.g. 83) and a second VDE actuator (e.g. 84), as discussed above in detail. Timeline 600 further includes plot 640, indicating whether the first IAO2 sensor is functioning as desired (yes) or not (no), and plot 645, indicating whether the second IAO2 sensor is functioning as desired (yes) or not (no), over time.

At time t0, the engine is off (plot 610), and conditions are not yet indicated to be met for conducting diagnostics on the IAO2 sensors (plot 605). In other words, it may be understood that at time t0, the vehicle is in a key-off state. The throttle (plot 615) is in a position it was in responsive to the key-off event. It may be understood that, with the engine off and the vehicle in a key-off state, the first IAO2 sensor and second IAO2 sensor are not actually monitoring hydrocarbon concentration in the intake, however, for clarity it is indicated that during engine-off/key-off conditions, conditions in the intake are lean.

Furthermore, with the engine off and the vehicle in a key-off state at time t0, fuel injection is off (plot 630), and the engine cylinders are not sealed (plot 635). To this point, there is no indication that the first IAO2 sensor is not functioning as desired (plot 640), and similarly there is no indication that the second IAO2 sensor is not functioning as desired (plot 645). In other words, both the first IAO2 sensor and the second IAO2 sensor are indicated to be functioning as desired at time t0.

At time t1, conditions are indicated to be met for conducting the diagnostic. Such conditions for entry into the IAO2 diagnostic(s) have been discussed in detail above at 410 of method 400, and thus for brevity will not be reiterated here. However, it may be understood that conditions being met at time t1 comprise at least a cold-start event (e.g. engine temperature below a threshold engine temperature), where a sealing capability of piston rings coupled to the cylinder(s) is not optimal or ideal, which may enable such an IAO2 diagnostic to be conducted.

With conditions being indicated to be met for conducting the IAO2 diagnostic at time t1, the throttle is commanded to a fully open position via the controller. Furthermore, fuel is provided to engine cylinders via the controller sending a signal to fuel injectors, commanding fuel to be injected to the cylinders. Still further, at time t1, the engine is controlled via the motor (e.g. 152) to rotate in a forward, or default direction. Such actions may comprise operating the engine in a first mode, for example.

With the engine being spun or rotated fueled but without spark, and under conditions where the cylinders are not sealed and thus where intake and exhaust valves coupled to each cylinder are operating to open and close, a first IAO2 sensor (e.g. 43a) baseline and a second IAO2 sensor (e.g. 43b) baseline may be obtained between time t1 and t2. In other words, the first IAO2 sensor and the second IAO2 sensor may indicate hydrocarbon concentration in the vicinity of the respective sensors, between time t1 and t2. Based on the obtained first IAO2 sensor baseline and second IAO2 sensor baseline, a first IAO2 threshold (represented by line 621), and a second IAO2 threshold (represented by line 626) may be set. Setting the first IAO2 threshold and the second IAO2 threshold may comprise setting the threshold(s) predetermined amounts higher than the indicated baseline(s), for example. The predetermined amounts higher may comprise an estimate of how much un-combusted hydrocarbons will be expected to be routed to the first and/or second IAO2 sensors during the diagnostic after establishing the baselines, for example.

With the first IAO2 threshold and the second IAO2 threshold set, and after a predetermined duration of spinning the engine fueled and without providing spark (see step 425 of method 400), at time t2 the cylinders are commanded sealed (plot 635), with fuel injection to the cylinders maintained (plot 630). Such actions may be understood to comprise operating the engine in a second mode of operation, for example. Between time t2 and t3, the first IAO2 sensor registers a response indicating that hydrocarbon concentration in the intake is greater than the first IAO2 threshold. Accordingly, the first IAO2 sensor is indicated to be functioning as desired (plot 640).

At time t3, with the first IAO2 sensor indicated to be functioning as desired, it may be understood that conditions are additionally met for conducting the diagnostic for the second IAO2 sensor (e.g. 43b). Accordingly, the engine is stopped from rotating at time t3, via the controller sending a signal to the motor (e.g. 152), actuating it to stop rotating the engine in the forward direction. Furthermore, fuel injection to the engine is stopped (plot 630). Still further, the cylinders are commanded unsealed at time t3 (plot 635). It may be understood that, between time t3 and t4, the engine spins to rest, and the throttle is maintained open. In this way, un-combusted hydrocarbons present in the intake may migrate to the second IAO2 sensor. However, between time t3 and t4, the second IAO2 sensor does not indicate a response greater than the second IAO2 threshold (plot 625). Accordingly, at time t4, the engine is controlled to be spun in a reverse direction (e.g. opposite that of the forward direction). The engine is controlled to be spun in reverse via the motor, where an H-bridge circuit may be utilized to enable the motor to rotate the engine in the reverse direction. Furthermore, the engine is controlled to rotate in reverse without fuel injection (plot 630), and without the cylinders being sealed (plot 635). Rotating the engine in reverse may thus function to route un-combusted hydrocarbons in the intake towards the second IAO2 sensor, positioned upstream from the first IAO2 sensor. However, between time t4 and t5, even with the engine rotating in reverse to direct the un-combusted hydrocarbons to the second IAO2 sensor, the second IAO2 sensor response remains below the second IAO2 threshold (line 626). Accordingly, at time t5, the second IAO2 sensor is indicated to be degraded (plot 645). Such an indication may be stored at the controller, and may further include adjusting vehicle operating conditions as a function of the degraded second IAO2 sensor. For example, exhaust gas recirculation during conditions where the engine is in operation may be used as infrequently as possible, due to the degraded second IAO2 sensor, for example. In another example, the first IAO2 sensor may be relied upon for sensing exhaust gas recirculation, under conditions where a purge event is not occurring.

With the second IAO2 sensor indicated to be degraded at time t5, the motor is commanded to stop the engine from rotating. In other words, the engine is commanded off. Shortly thereafter, at time t6, the engine is commanded via the motor to rotate in the forward direction. Accordingly, the engine is rotated in the forward direction (plot 610) unfueled (plot 630), between time t6 and t7. Thus, in this example timeline, un-combusted hydrocarbons are routed to the exhaust. While not explicitly illustrated, it may be understood that, in examples where the vehicle includes an electric heater configured to heat an emission control device, such an electric heater may be employed to raise temperature of the emission control device to its operational temperature, prior to routing un-combusted hydrocarbons to the exhaust.

Furthermore, while not explicitly illustrated, in some examples rather than routing the un-combusted hydrocarbons to the exhaust, the un-combusted hydrocarbons may be routed to the fuel vapor storage canister, as discussed. However, it may be understood that in this particular example, fuel level in a fuel tank of the vehicle is such that it is likely that the next refueling event may load the canister to a level where, if the canister were loaded with additional hydrocarbons from the IAO2 sensor diagnostic, then at the next refueling event bleed-through emissions may result.

At time t7, it may be understood that the un-combusted hydrocarbons have been routed from the intake to the exhaust, and thus conditions are no longer indicated to be met for conducting the IAO2 diagnostic. Further, the engine is activated at time t7 to combust air and fuel (plot 630). Thus, it may be understood that the engine is started in response to a vehicle operator-requested torque level that exceeds a capability of the motor (e.g. 152).

In this way, a first IAO2 sensor and a second IAO2 sensor may be diagnosed as to whether they are functioning as desired, during conditions where the engine is not in operation to combust air and fuel, and where the engine has limited engine run time which complicates the conducting of diagnostics for such sensors. By periodically diagnosing the first and second IAO2 sensors, under conditions where such sensor(s) may not otherwise be diagnosed due to limited engine run time, engine operation may be improved, customer satisfaction may be increased, and engine degradation may be reduced.

The technical effect is to recognize that at a cold-start event (engine temperature below a threshold engine temperature), piston rings coupled to pistons of engine cylinders may not be effective at preventing un-combusted hydrocarbons from migrating to a crankcase, and that such migration of un-combusted hydrocarbons may be utilized to diagnose whether the first and/or second IAO2 sensor(s) are functioning as expected. A further technical effect is to recognize that such migration of un-combusted hydrocarbons may be dramatically increased for a vehicle equipped with variable displacement technology, which may enable intake and exhaust valves for each cylinder of the engine to be actively closed, thus enabling sealing of the cylinders for which fuel is injected. More specifically, it is herein recognized that by sealing cylinders at a cold start event while maintaining fuel injection, un-combusted hydrocarbons may be routed to an intake of the engine, where the first and/or second IAO2 sensors may be excited (e.g. register a rich response due to an increase of hydrocarbon concentration resulting in a decrease in oxygen concentration) via the un-combusted hydrocarbons, provided they are functioning as desired. Accordingly, a still further technical effect is to recognize that, in order for the migration of un-combusted hydrocarbons to the intake to occur, a positive crankcase ventilation valve may ideally occupy a least-restrictive configuration, to enable a maximal amount of fuel vapor migration to the intake. Thus, a technical effect is to recognize that, during the injection of fuel into the sealed cylinder(s), by manipulating pressure in the intake, the PCV valve may occupy its least restrictive configuration, thus enabling such a methodology for diagnosing the first and second IAO2 sensors.

Yet another technical effect is to recognize that, with un-combusted hydrocarbons present in the intake (intake passage and/or intake manifold) as a result of the methodology described for rationalizing the first and/or second IAO2 sensors, the un-combusted hydrocarbons may be removed from the intake via either routing the un-combusted hydrocarbons to an exhaust of the engine, or to a fuel vapor canister for storage, subsequent to indicating whether the first and/or second IAO2 sensors are functioning as desired. Determining whether the route the fuel vapors to the canister or to engine exhaust may be a function of temperature of an exhaust emission control device, fuel level in a fuel tank of the vehicle, canister load, etc. In this way, the methodology may be conducted and the un-combusted hydrocarbons in the intake manifold may be effectively removed so as not to adversely impact downstream engine applications, such as engine starting, etc.

The systems described herein, and with reference to FIGS. 1-3C, along with the methods described herein, and with reference to FIGS. 4-5, may enable one or more systems and one or more methods. In one example, a method comprises injecting fuel into one or more cylinders of an engine of a vehicle without combustion, and routing uncombusted hydrocarbons from the one or more cylinders to a crankcase of the engine, the crankcase included in a crankcase ventilation system, and then to an intake manifold of the engine, in order to diagnose whether a first intake air oxygen sensor positioned in the intake manifold is functioning as desired. In a first example of the method, the method further includes wherein actively routing un-combusted hydrocarbons further comprises rotating the engine in a forward direction via a motor configured to rotate the engine, without providing spark to the one or more cylinders, and where the forward direction comprises a same direction of rotation as when the engine is operating to combust air and fuel. A second example of the method optionally includes the first example, and further comprises commanding fully open a throttle configured to control an amount of air inducted to the engine during conditions of engine operation. A third example of the method optionally includes any one or more or each of the first through second examples, and further includes wherein commanding fully open the throttle controls pressure in the intake manifold such that a positive crankcase valve positioned in a conduit coupling the crankcase to the intake manifold occupies a least-restrictive position. A fourth example of the method optionally includes any one or more or each of the first through third examples, and further includes wherein actively routing un-combusted hydrocarbons further comprises sealing the one or more cylinders of the engine. A fifth example of the method optionally includes any one or more or each of the first through fourth examples, and further includes wherein sealing the one or more cylinders of the engine includes commanding intake and exhaust valves coupled to each of the one or more cylinders of the engine to fully closed positions; wherein the engine comprises a variable displacement engine and wherein commanding the intake and exhaust valves coupled to each of the one or more cylinders to the fully closed positions involves actuating a first variable displacement engine actuator and actuating a second variable displacement engine actuator. A sixth example of the method optionally includes any one or more or each of the first through fifth examples, and further includes wherein actively routing un-combusted hydrocarbons further comprises a temperature of the engine below a threshold engine temperature, where one or more piston rings coupled to pistons of the one or more cylinders of the engine are inefficient at sealing the one or more cylinders from the crankcase. A seventh example of the method optionally includes any one or more or each of the first through sixth examples, and further comprises subsequent to the actively routing un-combusted hydrocarbons to the intake manifold of the engine, routing the un-combusted hydrocarbons to a position upstream of the intake manifold of the engine, to diagnose whether a second intake air oxygen sensor positioned in an intake passage of the engine is functioning as desired. An eighth example of the method optionally includes any one or more or each of the first through seventh examples, and further comprises indicating the first intake air oxygen sensor is functioning as desired provided the first intake air oxygen sensor responds to the actively routed un-combusted hydrocarbons with a first output above a first threshold; and indicating the second intake air oxygen sensor is functioning as desired provided the second intake air oxygen sensor responds to the un-combusted hydrocarbons with a second output above a second threshold. A ninth example of the method optionally includes any one or more or each of the first through eighth examples and further includes wherein the first threshold and the second threshold are a function of a first baseline and a second baseline, the first baseline and the second baseline established under conditions where the un-combusted hydrocarbons are not routed to the crankcase of the engine, and then to the intake manifold of the engine. A tenth example of the method optionally includes any one or more or each of the first through ninth examples, and further comprises removing the un-combusted hydrocarbons from the intake passage and/or the intake manifold subsequent to the indicating whether the first intake air oxygen sensor and/or the second intake air oxygen sensor is functioning as desired, where removing the un-combusted hydrocarbons includes routing the un-combusted hydrocarbons to an exhaust of the engine, or routing the un-combusted hydrocarbons to a fuel vapor storage canister configured to store fuel vapor from a fuel tank that provides fuel to the engine.

Another example of a method comprises spinning an engine of a vehicle in a forward direction while providing fuel injection but not spark and operating the engine in a first mode, to obtain a first baseline response of a first intake air oxygen sensor positioned in an intake manifold of the engine and to obtain a second baseline response of a second intake air oxygen sensor positioned in an intake passage upstream of the intake manifold; subsequent to obtaining the first baseline response and the second baseline response, maintaining spinning the engine in the forward direction with fuel injection but not spark and operating the engine in a second mode, to route un-combusted hydrocarbons to the first intake air oxygen sensor and the second intake air oxygen sensor via a crankcase ventilation system; and indicating whether the first intake air oxygen sensor and the second intake air oxygen sensor are functioning as desired based on whether a response of the first intake air oxygen sensor during operating the engine in the second mode is greater than a first threshold and whether a response of the second intake air oxygen sensor during operating the engine in the second mode is greater than a second threshold, the first and second thresholds set as a function of the first and second baseline responses. In a first example of the method, the method further includes wherein routing the un-combusted hydrocarbons to the first intake air oxygen sensor and the second intake air oxygen sensor via the crankcase ventilation system involves the un-combusted hydrocarbons being routed to a crankcase and then to the first intake air oxygen sensor and the second intake air oxygen sensor; and where operating the engine in the first mode and the second mode further comprises an engine temperature below a threshold engine temperature. A second example of the method optionally includes the first example, and further includes wherein the engine comprises a variable displacement engine, where operating the engine in the first mode includes intake and exhaust valves coupled to cylinders of the engine operating to open and close, and where operating the engine in the second mode includes sealing the cylinders via commanding fully closed the intake and exhaust valves coupled to the cylinders of the engine. A third example of the method optionally includes any one or more or each of the first through second examples, and further includes wherein indicating whether the second intake air oxygen sensor is functioning as desired further comprises: first diagnosing the first intake air oxygen sensor while operating the engine in the second mode, and then diagnosing the second intake air oxygen sensor by stopping spinning the engine in the forward direction, to allow the un-combusted hydrocarbons to migrate to the second intake air oxygen sensor in order to diagnose the second intake air oxygen sensor. A fourth example of the method optionally includes any one or more or each of the first through third examples, and further comprises in response to a predetermined duration of time elapsing between stopping spinning the engine in the forward direction and without the response of the second intake air oxygen sensor being greater than the second threshold, rotating the engine unfueled in a reverse direction opposite the forward direction, to route the un-combusted hydrocarbons to the second intake air oxygen sensor in order to indicate whether the second intake air oxygen sensor is functioning as desired. A fifth example of the method optionally includes any one or more or each of the first through fourth examples, and further includes wherein spinning the engine in the forward direction and operating the engine in the first mode, and wherein spinning the engine in the forward direction and operating the engine in the second mode, further comprises controlling pressure in the intake manifold via commanding fully open an intake throttle positioned upstream of the first intake air oxygen sensor but downstream of the second intake air oxygen sensor; and wherein commanding fully open the intake throttle results in a positive crankcase ventilation valve positioned in a conduit of the crankcase ventilation system adopting an open configuration, the open configuration enabling the routing of un-combusted hydrocarbons to the first intake air oxygen sensor and the second intake air oxygen sensor via the crankcase ventilation system.

A system for a hybrid vehicle comprises an engine system including a variable displacement engine, an intake passage, an intake manifold, an exhaust, a set of cylinders, a set of pistons coupled to the set of cylinders, the set of pistons including piston rings, intake and exhaust valves mechanically coupled to each cylinder of the set of cylinders, a first variable displacement engine actuator configured to control position of the intake valves and a second variable displacement engine actuator configured to control position of the exhaust valves, a set of fuel injectors, each fuel injector of the set configured to provide fuel to each of the cylinders of the set of cylinders, and an engine temperature sensor; a crankcase ventilation system including a crankcase, a conduit selectively fluidically coupling the crankcase to the intake manifold, and a positive crankcase ventilation valve positioned in the conduit; a motor configured to rotate the engine; a first intake air oxygen sensor positioned in the intake manifold; a second intake air oxygen sensor positioned in the intake passage; a throttle positioned in the intake passage between the first intake air oxygen sensor and the second intake air oxygen sensor; and a controller storing instructions in non-transitory memory that, when executed, cause the controller to: with engine temperature below a threshold engine temperature, command fully open the throttle; rotate the engine in a forward direction fueled but without spark and with the intake and exhaust valves operating to open and close, to obtain a first baseline response of the first intake air oxygen sensor and a second baseline response of the second intake air oxygen sensor; seal the cylinders while maintaining fueling to the cylinders and maintaining rotating the engine in the forward direction subsequent to obtaining the first and second baseline responses, where sealing the cylinders comprises closing the intake valves via the first variable displacement engine actuator and closing the exhaust valves via the second variable displacement engine actuator, and where sealing the cylinders routes un-combusted hydrocarbons from the injected fuel past the piston rings and through the conduit to the intake manifold via the positive crankcase ventilation valve, the positive crankcase ventilation valve in an open configuration as a result of the throttle being commanded fully open; and diagnosing whether the first intake air oxygen sensor and the second intake air oxygen sensor are functioning as desired based at least in part on the routing of un-combusted hydrocarbons to the intake manifold. In a first example of the system, the controller stores further instructions to diagnose the first intake air oxygen sensor by indicating the first intake air oxygen sensor is functioning as desired in response to a first threshold response of the first intake air oxygen sensor being reached while the engine is rotating in the forward direction with the cylinders sealed, the first threshold response a function of the first baseline response; and diagnose the second intake air oxygen sensor by first diagnosing the first intake air oxygen sensor, then stopping rotating the engine in the forward direction, to allow for the un-combusted hydrocarbons to migrate to the second intake air oxygen sensor, and indicating the second intake air oxygen sensor is functioning as desired responsive to a second threshold response of the second intake air oxygen sensor being reached while the engine is stopped from rotating. A second example of the system optionally includes the first example, and further comprises a fuel vapor storage canister positioned in an evaporative emissions system of the vehicle; a canister purge valve positioned in a purge conduit between the intake manifold and the fuel vapor storage canister; a vacuum pump positioned in a vent line between the fuel vapor storage canister and atmosphere; and wherein the controller stores further instructions to remove the un-combusted hydrocarbons to either the exhaust or to the fuel vapor storage canister subsequent to diagnosing the first and second intake air oxygen sensors, where removing the un-combusted hydrocarbons to the exhaust involves rotating the engine unfueled in the forward direction with the intake and exhaust valves operating to open and close, and where removing the un-combusted hydrocarbons to the fuel vapor storage canister includes commanding open the canister purge valve, and operating the vacuum pump to draw the un-combusted hydrocarbons from the intake passage and intake manifold to the fuel vapor storage canister.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    injecting fuel into one or more cylinders of an engine of a vehicle without combustion, and routing un-combusted hydrocarbons from the one or more cylinders to a crankcase of the engine, the crankcase included in a crankcase ventilation system, and then to an intake manifold of the engine, in order to diagnose whether a first intake air oxygen sensor positioned in the intake manifold is functioning as opposed to malfunctioning due to degradation; and
    subsequent to routing un-combusted hydrocarbons to the intake manifold of the engine, routing the un-combusted hydrocarbons to a position upstream of the intake manifold of the engine, to diagnose whether a second intake air oxygen sensor positioned in an intake passage of the engine is functioning.

2. The method of claim 1, wherein routing uncombusted hydrocarbons further comprises rotating the engine in a forward direction via a motor configured to rotate the engine, without providing spark to the one or more cylinders, and wherein the forward direction comprises a same direction of rotation as when the engine is operating to combust air and fuel.

3. The method of claim 1, further comprising commanding fully open a throttle configured to control an amount of air inducted to the engine during conditions of engine operation.

4. The method of claim 3, wherein commanding fully open the throttle controls pressure in the intake manifold such that a positive crankcase valve positioned in a conduit coupling the crankcase to the intake manifold occupies a least-restrictive position.

5. The method of claim 1, wherein routing uncombusted hydrocarbons further comprises sealing the one or more cylinders of the engine.

6. The method of claim 5, wherein sealing the one or more cylinders of the engine includes commanding intake and exhaust valves coupled to each of the one or more cylinders of the engine to fully closed positions; and
    wherein the engine comprises a variable displacement engine, and wherein commanding the intake and exhaust valves coupled to each of the one or more cylinders to the fully closed positions involves actuating a first variable displacement engine actuator and actuating a second variable displacement engine actuator.

7. The method of claim 1, wherein routing uncombusted hydrocarbons is in further response to a temperature of the engine below a threshold engine temperature, and wherein one or more piston rings coupled to pistons of the one or more cylinders of the engine are inefficient at sealing the one or more cylinders from the crankcase.

8. The method of claim 1, further comprising:
    indicating the first intake air oxygen sensor is functioning provided the first intake air oxygen sensor responds to the routed un-combusted hydrocarbons with a first output above a first threshold; and
    indicating the second intake air oxygen sensor is functioning provided the second intake air oxygen sensor responds to the routed un-combusted hydrocarbons with a second output above a second threshold.

9. The method of claim 8, wherein the first threshold and the second threshold are a function of a first baseline and a second baseline, the method further comprising establishing the first baseline and the second baseline under conditions where the un-combusted hydrocarbons are not routed to the crankcase of the engine and then to the intake manifold of the engine.

10. The method of claim 8, further comprising:
    removing the un-combusted hydrocarbons from the intake passage and/or the intake manifold subsequent to the indicating whether the first intake air oxygen sensor and/or the second intake air oxygen sensor is functioning, wherein removing the un-combusted hydrocarbons includes routing the un-combusted hydrocarbons to an exhaust of the engine or routing the un-combusted hydrocarbons to a fuel vapor storage canister configured to store fuel vapor from a fuel tank that provides fuel to the engine.

11. A method comprising:
    spinning an engine of a vehicle in a forward direction while providing fuel injection but not spark and operating the engine in a first mode to obtain a first baseline response of a first intake air oxygen sensor positioned in an intake manifold of the engine and to obtain a second baseline response of a second intake air oxygen sensor positioned in an intake passage upstream of the intake manifold;
    subsequent to obtaining the first baseline response and the second baseline response, maintaining spinning the engine in the forward direction with fuel injection but not spark and operating the engine in a second mode to route un-combusted hydrocarbons to the first intake air oxygen sensor and the second intake air oxygen sensor via a crankcase ventilation system; and
    indicating whether the first intake air oxygen sensor and the second intake air oxygen sensor are functioning as opposed to malfunctioning due to degradation based on whether a response of the first intake air oxygen sensor during operating the engine in the second mode is greater than a first threshold and whether a response of the second intake air oxygen sensor during operating the engine in the second mode is greater than a second threshold, the first threshold and the second threshold set as a function of the first baseline response and the second baseline response.

12. The method of claim 11, wherein routing the un-combusted hydrocarbons to the first intake air oxygen sensor and the second intake air oxygen sensor via the crankcase ventilation system involves the un-combusted hydrocarbons being routed to a crankcase and then to the first intake air oxygen sensor and the second intake air oxygen sensor; and wherein operating the engine in the first mode and the second mode is in further response to an engine temperature below a threshold engine temperature.

13. The method of claim 11, wherein the engine comprises a variable displacement engine, and wherein operating the engine in the first mode includes intake and exhaust valves coupled to cylinders of the engine operating to open and close and operating the engine in the second mode includes sealing the cylinders via commanding fully closed the intake and exhaust valves coupled to the cylinders of the engine.

14. The method of claim 11, wherein indicating whether the second intake air oxygen sensor is functioning further comprises:
first diagnosing the first intake air oxygen sensor while operating the engine in the second mode, and then diagnosing the second intake air oxygen sensor by stopping spinning the engine in the forward direction to allow the un-combusted hydrocarbons to migrate to the second intake air oxygen sensor in order to diagnose the second intake air oxygen sensor.

15. The method of claim 14, further comprising:
in response to a predetermined duration of time elapsing between stopping spinning the engine in the forward direction and without the response of the second intake air oxygen sensor being greater than the second threshold, rotating the engine unfueled in a reverse direction, opposite the forward direction, to route the un-combusted hydrocarbons to the second intake air oxygen sensor in order to indicate whether the second intake air oxygen sensor is functioning.

16. The method of claim 11, wherein spinning the engine in the forward direction and operating the engine in the first mode and spinning the engine in the forward direction and operating the engine in the second mode further comprises controlling pressure in the intake manifold via commanding fully open an intake throttle positioned upstream of the first intake air oxygen sensor but downstream of the second intake air oxygen sensor; and
wherein commanding fully open the intake throttle results in a positive crankcase ventilation valve positioned in a conduit of the crankcase ventilation system adopting an open configuration, the open configuration enabling routing of un-combusted hydrocarbons to the first intake air oxygen sensor and the second intake air oxygen sensor via the crankcase ventilation system.

17. A system for a hybrid vehicle, comprising:
an engine system including a variable displacement engine, an intake passage, an intake manifold, an exhaust, a set of cylinders, a set of pistons coupled to the set of cylinders, the set of pistons including piston rings, intake and exhaust valves mechanically coupled to each cylinder of the set of cylinders, a first variable displacement engine actuator configured to control positions of the intake valves and a second variable displacement engine actuator configured to control positions of the exhaust valves, a set of fuel injectors, each fuel injector of the set configured to provide fuel to each of the cylinders of the set of cylinders, and an engine temperature sensor;
a crankcase ventilation system including a crankcase, a conduit selectively fluidically coupling the crankcase to the intake manifold, and a positive crankcase ventilation valve positioned in the conduit;
a motor configured to rotate the engine;
a first intake air oxygen sensor positioned in the intake manifold;
a second intake air oxygen sensor positioned in the intake passage;
a throttle positioned in the intake passage between the first intake air oxygen sensor and the second intake air oxygen sensor; and
a controller storing instructions in non-transitory memory that, when executed, cause the controller to:
with engine temperature below a threshold engine temperature, command fully open the throttle;
rotate the engine in a forward direction fueled but without spark and with the intake and exhaust valves operating to open and close to obtain a first baseline response of the first intake air oxygen sensor and a second baseline response of the second intake air oxygen sensor;
seal the cylinders while maintaining fueling to the cylinders and maintaining rotating the engine in the forward direction subsequent to obtaining the first and second baseline responses, wherein sealing the cylinders comprises closing the intake valves via the first variable displacement engine actuator and closing the exhaust valves via the second variable displacement engine actuator, and wherein sealing the cylinders routes un-combusted hydrocarbons from the injected fuel past the piston rings and through the conduit to the intake manifold via the positive crankcase ventilation valve, the positive crankcase ventilation valve in an open configuration as a result of the throttle being commanded fully open; and
diagnosing whether the first intake air oxygen sensor and the second intake air oxygen sensor are functioning as opposed to malfunctioning due to degradation based at least in part on the routing of un-combusted hydrocarbons to the intake manifold.

18. The system of claim 17, wherein the controller stores further instructions to:
diagnose the first intake air oxygen sensor by indicating the first intake air oxygen sensor is functioning in response to a first threshold response of the first intake air oxygen sensor being reached while the engine is rotating in the forward direction with the cylinders sealed, the first threshold response a function of the first baseline response; and
diagnose the second intake air oxygen sensor by first diagnosing the first intake air oxygen sensor, then stopping rotating the engine in the forward direction to allow for the un-combusted hydrocarbons to migrate to the second intake air oxygen sensor, and indicating the second intake air oxygen sensor is functioning responsive to a second threshold response of the second intake air oxygen sensor being reached while the engine is stopped from rotating.

19. The system of claim 18, further comprising:
a fuel vapor storage canister positioned in an evaporative emissions system of the vehicle;
a canister purge valve positioned in a purge conduit between the intake manifold and the fuel vapor storage canister; and
a vacuum pump positioned in a vent line between the fuel vapor storage canister and atmosphere;
wherein the controller stores further instructions to remove the un-combusted hydrocarbons to either the exhaust or to the fuel vapor storage canister subsequent to diagnosing the first intake air oxygen sensor and the second intake air oxygen sensor, wherein removing the un-combusted hydrocarbons to the exhaust involves rotating the engine unfueled in the forward direction with the intake and exhaust valves operating to open and close, and wherein removing the un-combusted hydrocarbons to the fuel vapor storage canister includes commanding open the canister purge valve and operating the vacuum pump to draw the un-combusted hydrocarbons from the intake passage and the intake manifold to the fuel vapor storage canister.

* * * * *